United States Patent [19]

Fujita

[11] Patent Number: 4,910,690

[45] Date of Patent: Mar. 20, 1990

[54] MICRO-DIMENSIONAL MEASUREMENT APPARATUS

[75] Inventor: Hiroo Fujita, Sayama, Japan

[73] Assignee: Citizen Watch Co., Ltd., Tokyo, Japan

[21] Appl. No.: 319,891

[22] Filed: Mar. 7, 1989

Related U.S. Application Data

[63] Continuation of Ser. No. 14,619, Feb. 13, 1987, abandoned.

[30] Foreign Application Priority Data

Feb. 14, 1986 [JP] Japan .................................. 61-30467
Feb. 21, 1986 [JP] Japan .................................. 61-37054
Jan. 23, 1987 [JP] Japan .................................. 62-12264

[51] Int. Cl.$^4$ ...................... G01B 11/00; G01N 21/86
[52] U.S. Cl. .................................... 364/561; 250/561; 356/398; 356/394; 382/8
[58] Field of Search ........... 364/550, 551.01, 559–563; 356/398, 394; 250/560, 561, 572; 382/4, 8; 358/101, 108

[56] References Cited

U.S. PATENT DOCUMENTS

| | | | |
|---|---|---|---|
| 4,347,001 | 8/1982 | Levy et al. .......................... 356/398 |
| 4,543,602 | 9/1985 | Kai et al. ........................ 356/398 X |
| 4,641,257 | 2/1987 | Ayata ................................. 364/559 |
| 4,650,335 | 3/1987 | Ito et al. .............................. 356/398 |
| 4,654,583 | 3/1987 | Ninomiya et al. .............. 356/394 X |
| 4,692,690 | 9/1987 | Hara et al. ...................... 356/398 X |
| 4,692,943 | 9/1987 | Pietzsch et al. .................... 358/107 |
| 4,731,855 | 3/1988 | Suda et al. .............................. 382/8 |
| 4,732,473 | 3/1988 | Bille et al. ....................... 250/560 X |
| 4,743,770 | 5/1988 | Lee ...................................... 250/560 |
| 4,744,662 | 5/1988 | Suto et al. ....................... 250/560 X |
| 4,748,335 | 5/1988 | Lindow et al. ..................... 250/572 |

FOREIGN PATENT DOCUMENTS 2147097 5/1985 United Kingdom .

OTHER PUBLICATIONS

"Electronic's", vol. 20, May 1978, pp. 36–41, [Untranslated Japanese Publication].

Primary Examiner—Parshotam S. Lall
Assistant Examiner—Joseph L. Dixon
Attorney, Agent, or Firm—Finnegan, Henderson, Farabow, Garrett and Dunner

[57] ABSTRACT

In a micro-dimensional measurement apparatus including an optical scanning system and a processor for optical data obtained therefrom, the measurement is based upon a comparison of previously prepared reference data and optical data obtained from an object to be measured. The comparison is carried out by using at least two kinds of optical data.

30 Claims, 28 Drawing Sheets

Fig. 13 A
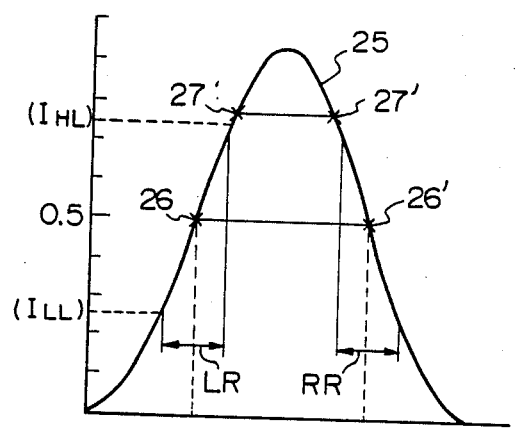
Fig. 13 B
Fig. 13 C
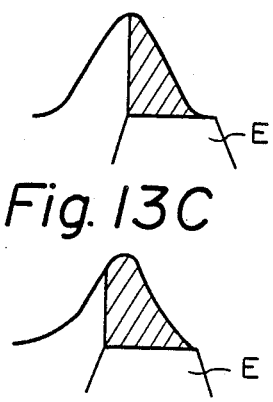
Fig. 14 A
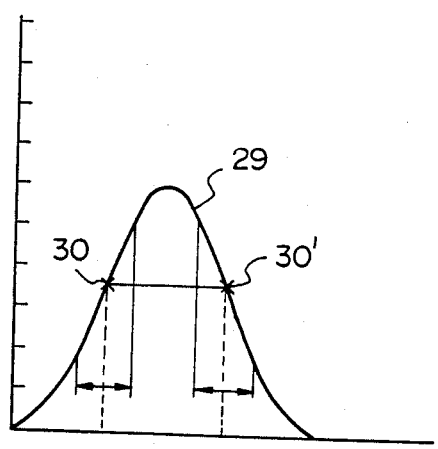
Fig. 14 B
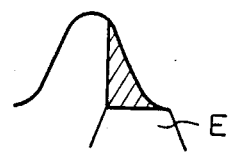

MICRO-DIMENSIONAL MEASUREMENT APPARATUS

This application is a continuation, of application Ser. No. 09/014,619, filed Feb. 13, 1987, now abandoned.

BACKGROUND OF THE INVENTION

(1) Field of the Invention

The present invention relates to a micro-dimensional measurement apparatus for optically measuring a dimension between opposed edges formed on a surface of a substrate, and more particularly, to such a micro-dimensional measurement apparatus wherein the measurement is carried out by optically scanning the substrate with a light beam having a predetermined light intensity distribution, such as a Gaussian distribution.

(2) Description of the Related Art

Recent developments in precision manufacturing demand a very high accuracy in the working of various precision components. For example, in the manufacturing of a precision component such as an integrated circuit, a magnetic head or the like, the working accuracy must be on the order of less than 1 $\mu$m. Accordingly, there is a pressing need for a micro-dimensional measurement apparatus by which a fine precision component can be dimensionally measured with a high accuracy and reliability.

In this field, it is well known to dimensionally measure a fine object by an optical measuring system which includes a white light source for illuminating the fine object, a microscope for magnifying an image of the illuminated fine object, a television camera for reading optical information as video data from the magnified image, and a processor for processing the video data to calculate a dimension of the fine object.

For example, where the width of a fine gap formed between magnet portions of a magnetic head is measured by the optical measuring system, the area of the magnetic head which includes the fine gap to be measured is magnified by the microscope under illumination of the white light source, and then optical information is read by the television camera as a series of video data from the magnified image. The series of video data is processed by the processor so that an intensity pattern of the light reflected from the measured area is prepared with respect to a series of addresses of picture elements which are read by an image sensor of the television camera. In other words, the reflected light intensity pattern so obtained can be considered to be a function of a distance measured along a line which crosses over the fine gap at the measured area. Since the gap zone of the magnet head has a lower reflectivity than that of the magnet portions thereof, the reflected light intensity pattern has a minimum pea which corresponds to a middle point between the gap edges. In particular, the reflected light intensity pattern profiles a curve descending gradually toward a minimum peak and then ascending therefrom.

In this prior optical measurement system, to measure a width of the gap zone, a slice pitch which is obtained by slicing the reflected light intensity pattern at a predetermined slice level, is calculated by the processor. This slice pitch corresponds to the number of picture elements which are read by the television camera at the gap zone along the line crossing over the measured area. Accordingly, if a reference value is previously prepared, which is obtained from a known width of a sample gap in the same manner as mentioned above, it is possible to calculate a width of the gap zone from the measured slice pitch on the basis of that reference value. Nevertheless, the optical measurement system mentioned above suffers from drawbacks resulting from the use of the white light source. In particular, it is impossible to carry out the measurement with high accuracy and reliability because it is difficult to stabilize an intensity distribution of the white light source with the passage of time. Also, when a fine dimension on the order of less than 1 $\mu$m is measured, the accuracy of the measurement is not at all satisfactory because it is very difficult to obtain a fine spot for the illumination from the white light source, so that the light picked up from the fine gap zone is affected by the light reflected from the remaining zone, except for the measured area.

British Patent No. 2147097 discloses another type of optical measurement system for dimensionally measuring a fine object, which system includes a laser light source for emitting a laser beam having a Gaussian distribution, an acoustic-optical device for stepwise deflection of the laser beam, to scan the fine object to be measured with the laser beam, a detector for detecting the laser beam reflected from the fine object, and a processor for processing the reflection data obtained from the detector to calculate a dimension of the fine object.

This prior optical measurement system is directed to measuring a dimension between opposed edges formed on a substrate by scanning the substrate with a laser beam under the condition that, when the laser beam is projected on an edge line of the opposed edges, a portion of the projected laser beam which is included at one side of the edge line is detected by the detector, but the other portion thereof which is included at the other side of the edge line is not detected by the detector. For example, if an element having a trapezoid cross-section is provided on the substrate, it is possible to measure a dimension between opposed edges of such an element by this prior optical measurement system because these edge fulfill the condition as mentioned above, in that when the laser beam is projected on the edge lines of the element, a portion of the projected laser beam impinging on an oblique face extending from each of the edge lines toward the substrate surface is not detected by the detector. Furthermore, this prior optical measurement apparatus is directed to a measurement of a dimension of the opposed edges, which dimension is greater than a spot diameter of the laser beam.

In this optical measurement system, when a substrate having the element as mentioned above is stepwise scanned with the laser beam under control of the acoustic-optical device, so that the laser beam crosses over each of the edge lines of the element, the light beams reflected from the substrate at the scanning steps are detected by the detector as a series of reflection data. The processor prepares a reflected light intensity pattern on the basis of the series of reflection data with respect to a series of deflection voltage values, each of which is applied to the acoustic-optical device to deflect the laser beam on each of the scanning steps.

Also, the processor arithmetically processes two portions of the reflected light intensity pattern which correspond to two zones including the edge lines, respectively, so that each of the two portions of the reflected light intensity pattern is represented by a three-dimensional function based upon the method of least squares. Each of the three-dimensional functions so obtained has a point of inflection which is in accord with the corresponding edge line, because a rate of change of the function (that is, the reflected light intensity) reaches a maximum when the peak of the Gaussian distribution of the laser bean is in accord with each of the edge lines during the scanning. It can be easily understood that a distance between the two points of inflection corresponds to a dimension to be measured between the opposed edges.

Accordingly, in this prior optical measurement apparatus, a dimension to be measured between the edges formed on the substrate is calculated by the processor on the basis of a distance between the two points of inflection, which are found by differentiating the three-dimensional functions to determine the maximum rates of change thereof.

Note, in general, it is possible to throttle a laser beam spot to the order of 1 $\mu$m. As mentioned above, this prior optical measurement apparatus is directed to the measurement of a dimension of a fine object which is larger than a spot diameter of the laser beam. Therefore, the measurement of such a fine object can be satisfactorily carried out with a high accuracy and reliability. However, when a dimension to be measured between opposed edges of the fine object is less than 1 $\mu$m, the accuracy and reliability of the measurement is considerably downgraded because a reflected light intensity pattern resulting from the fine object has two kink points at the two portions thereof which should be represented by a three-dimensional function based upon the method of least squares, as mentioned above. Since a rate of change of an intensity of the light reflected from the fine object is discontinuously varied at the kink points, it is impossible t properly represent the portions of the reflected light intensity pattern by the three-dimensional function. In particular, when the laser beam crosses over a dimension between the edge lines which is smaller than a spot diameter of the laser beam, the spot of the laser beam first passes through one of the edges lines, and the leading edge of the spot then abuts against the other edge line without completely passing through one of the edge lines. Thereafter, the spot of the laser beam bridges the edge lines, and then the tailing edge of the spot leaves one of the edge lines. Therefore, during the scanning, the rate of change of the intensity is discontinuously varied when the leading edge of the spot abuts against the other edge line and when the tailing edge leaves one of the edges lines.

SUMMARY OF THE INVENTION

Accordingly, it is an object of the present invention to provide a micro-dimensional measurement apparatus for optically measuring a fine dimension between opposed edges formed on a substrate by scanning the substrate with a light beam having a predetermined light intensity distribution, such as a Gaussian distribution, wherein it is possible to carry out the measurement with a high accuracy and reliability although the dimension of the opposed edges to be measured is smaller than a spot diameter of the light beam.

It is also an object of the present invention to provide a micro-dimensional measurement apparatus as above-mentioned, wherein it is possible to carry out the measurement with a high accuracy and reliability although the reflectivity of the measurement zone to be scanned between the opposed edges is variable.

It is a further object of the present invention to provide a micro-dimensional measurement apparatus as above-mentioned, wherein it is possible to carry out the measurement with a high accuracy and reliability although a reflectivity of the measuring zone to be scanned between the opposed edges is unknown.

In accordance with an aspect of the present invention, there is provided a micro-dimensional measurement apparatus for optically measuring a dimension between opposed edges formed on a surface of a substrate, which comprises: a light source for generating a light beam having a predetermined light intensity distribution; an optical scanning system for scanning the substrate with the light beam so that the light beam crosses over the measuring zone between the opposed edges formed thereon; means for detecting intensity information of the light reflected from the substrate; means for preparing a reflected light intensity data pattern concerning a scanning distance of the light beam on the basis of the detected light intensity information; means for calculating two kinds of reflection data from the reflected light intensity data pattern; means for storing two kinds of reference data which correspond to the two kinds of reflection data, respectively; means for calculating two distance values concerning the dimension to be measured between the opposed edges from the two kinds of reference data on the basis of the two kinds of reflection data, respectively; means for calculating a difference value between the two distance values; means for determining whether or not the difference value falls within a permissible range; and means for calculating a mean value from the two distance values as a measured dimension between the opposed edges when the difference value falls within the permissible range.

The two kinds of reflection data may comprise two kinds of data selected from the group consisting of a peak value of the reflected light intensity data pattern an integrated value thereof, and a slice pitch value obtained by slicing the pattern at a predetermined level. On the other hand, the two kinds of reference data may comprise two kinds of data correspondingly selected from the group consisting of peak values of a series of reflected light intensity sample patterns corresponding to the reflected light intensity data pattern, integrated values hereof, and slice pitch values obtained by slicing the pattern at the predetermined level as mentioned above. The series of reflected light intensity sample patterns is prepared with respect to predetermined known sample distances concerning the dimension to be measured between the opposed edges.

If a reflectivity of the measuring zone to be scanned between the opposed edges is variable, the series of reflected light intensity sample patterns is prepared with respect to the predetermined sample distances on each of predetermined sample reflectivities concerning the measuring zone.

The micro-dimensional measurement apparatus may further include means for smoothing the reflected light intensity data pattern before two kinds of reflection data are calculated therefrom.

When the two distance values are calculated from the two kinds of reflection data, respectively, on the basis of the series of reflected light intensity sample pattern, an interpolation method is preferably introduced.

In accordance with another aspect of the present invention, there is provided a micro-dimensional measurement apparatus for optically measuring a dimension between opposed edges formed on a surface of a substrate, which comprises: a light source for generating a light beam having a predetermined light intensity distribution; an optical scanning system for scanning the substrate with the light beam so that the light beam crosses over the dimension between the opposed edges formed thereon; means for detecting intensity information of tee light, reflected from the substrate; means for preparing a reflected light intensity data pattern concerning a scanning distance of the light beam on the basis of the detected light intensity information;; means for calculating three kinds of reflection data from the reflected light intensity data pattern; means for storing three kinds of reference data which correspond to the three kinds of reflection data, respectively; means for calculating three distance values concerning the dimension to be measured between the opposed edges from the three kinds of reference data on the basis of the three kinds of reflection data, respectively; means for calculating three difference values among the three distance values; means for determining whether or not the three difference values fall within a permissible range; and means for calculating a mean value from the three distance values as a measured dimension between the opposed edges when three difference values fall within the permissible range.

This micro-dimensional measurement apparatus may further comprise means for determining whether or not said three difference values fall within a narrower permissible range than one half of the permissible range when at least one of the three difference values is more than the permissible range; and means for calculating a mean value from two values selected from the three distance values when one of three difference values falls within the narrower permissible range; the difference value falling within the narrower permissible range resulting from the selected two distance values.

One of the three kinds of reflection data consists of a peak value of the reflected light intensity data pattern, another kind of reflection data consists of an integrated value of the reflected light intensity data pattern, and the other kind of reflection data consists of a slice pitch value obtained by slicing the reflected light intensity data pattern at a predetermined level. On the other hand, one of the three kinds of reference data consists of peak values of a series of reflected light intensity sample patterns corresponding to the reflected light intensity data pattern, another kind of reference data consists of integrated values of the series of reflected light intensity sample patterns, and the other kind of reference data consists of slice pitch values obtained by slicing the series of reflected light intensity sample pattern at the predetermined level, as mentioned above. The series of reflected light intensity sample patterns being prepared with respect to predetermined sample distances concerning the dimension to be measured between the opposed edges.

If a reflectivity of the measuring zone to be scanned between the opposed edges is variable, the series of reflected light intensity sample patterns is prepare with respect to the predetermined sample distances of each of the predetermined sample reflectivities concerning the measuring zone.

The micro-dimensional measurement apparatus may further include means for smoothing the reflected light intensity data pattern before the three kinds of reflection data are calculated therefrom.

When the three distance values are calculated from the three kinds of reflection data, respectively, on the basis of the series of reflected light intensity sample patterns, an interpolation method is preferably introduced.

In accordance with a further aspect of the present invention, there is provided a micro-dimensional measurement apparatus for optically measuring a dimension between opposed edges formed on a surface of a substrate, a reflectivity of a measuring zone between the opposed edges being variable, which comprises: a light source for generating a light beam having a predetermined light intensity distribution; an optical scanning system for scanning the substrate with the light beam so that the light beam crosses over the dimension between the opposed edges formed thereon; means for detecting intensity information of the light reflected from the substrate; means for preparing a reflected light intensity data pattern concerning a scanning distance of the light beam on the basis of the detected light intensity information; means for calculating three kinds of reflection data from the reflected light intensity data pattern, one of the three kinds of reflection data consisting of a peak value of the reflected light intensity data pattern, another kind of reflection data consisting of an integrated value of the reflected light intensity data pattern, and the other kind of reflection data consisting of a slice pitch value obtained by slicing the reflected light intensity data pattern at a predetermined level; means for storing three kinds of reference data which correspond to the three kinds of reflection data, respectively, one of the three kinds of reference data consisting of peak values of a series of reflected light intensity sample patterns corresponding to the reflected light intensity data pattern, another kind of reference data consisting of integrated values of the series of reflected light intensity sample patterns, and the other kind of reference data consisting of slice pitch values obtained by slicing the series of reflected light intensity sample patterns at a predetermined level, the series of reflected light intensity sample patterns being prepared with respect to redetermined sample distances of each of reflectivities concerning the measuring zone to be scanned between the opposed edges; means for calculating a distance value concerning the dimension to be measured between the opposed edges from the peak values and integrated values of the three kinds of reference data on the basis of the peak value and integrated value of the three kinds of reflection data; means for calculating another distance value concerning the dimension to be measured between the opposed edges from the peak values and slice pitch values of the three kinds of reference data on the basis of the peak value and slice pitch value of the three kinds of reflection data; means for calculating a difference value between the two distance values; means for determining whether or not the difference value falls within a permissible range; and means for calculating a means value from the two distance values as a measured distance between the opposed edges when the three difference values fall within the permissible range.

The micro-dimensional measurement apparatus may further include means for smoothing the reflected light intensity data pattern before the three kinds of reflection data are calculated therefrom.

When each of the two distance values are calculated from two data of the three kinds of reflection data on the basis of the series of reflected light intensity sample patterns, an interpolation method is preferably introduced.

In accordance with a further aspect of the present invention, there is provided a micro-dimensional measurement apparatus for optically measuring a dimension between opposed edges formed on a surface of a substrate by using a laser beam having a Gaussian intensity distribution, the opposed edges being equal to or smaller than a diameter of the laser beam, which comprises: an optical scanning system for scanning the substrate with the laser beam s that the light beam crosses over the opposed edges formed thereon; means for detecting intensity information of the light reflected from the substrate; means for preparing a reflected light intensity data pattern concerning a scanning distance of the light beam on the basis of the detected light intensity information, the reflected light intensity data pattern including different reflection data; means for calculating at least one of the different reflection data from the reflected light intensity data pattern; means for storing a predetermined reference data corresponding to the at least one reflection data; means for comparing the magnitude of at least one reflection data and the reference data; means for calculating a three-dimensional function which represents a part of the reflected light intensity data pattern at each side of the peak thereof when the at least one reflection data is larger than the reference data, the part corresponding to an intensity range which is predetermined on the basis of a reflected light intensity reference pattern; means for differentiating the three-dimensional function o find a point of inflection within the intensity range at each side of the peak of the reflected light intensity data pattern; means for calculating a scanning distance between the two points of inflection so obtained at the sides of the peak of said reflected light intensity data pattern; means for calculating a distance value between the opposed edges on the basis of the scanning distance between the points of inflection; means for differentiating at twice the reflected light intensity data pattern to find two kink points thereof at the sides of the peak thereof when the at least one reflection data is smaller than the reference data; means for calculating a scanning distance between the two kink points so obtained; and means for calculating the dimension between the opposed edges on the basis of the scanning distance between the two kink points.

The at least one reflection data may consist of one of a peak value, an integrated value, and a slice pitch value obtained from the reflected light intensity data pattern. The reference data correspondingly consists of one of a peak value, an integrated value, and a slice pitch value obtained from a reflected light intensity sample pattern which is prepared with respect to a sample distance preferably equal to 65% of a diameter of the laser beam.

The reflected light intensity reference pattern is prepared with respect to a sample distance preferably equal to a diameter of the laser beam. The intensity range being preferably from 25 to 75% of the peak intensity of the reflected light intensity reference pattern.

BRIEF DESCRIPTION OF THE DRAWINGS

These and other objects of the present invention will be better understood from the following description, with reference to the accompanying drawings, in which:

FIGS. 13A, 13B, and 13C are schematic illustrations for explaining the measurement principle of the present invention;

FIGS. 14A and 14B are also schematic illustrations for explaining the measurement principle of the present invention;

DESCRIPTION OF THE PREFERRED EMBODIMENTS

Figure 1:
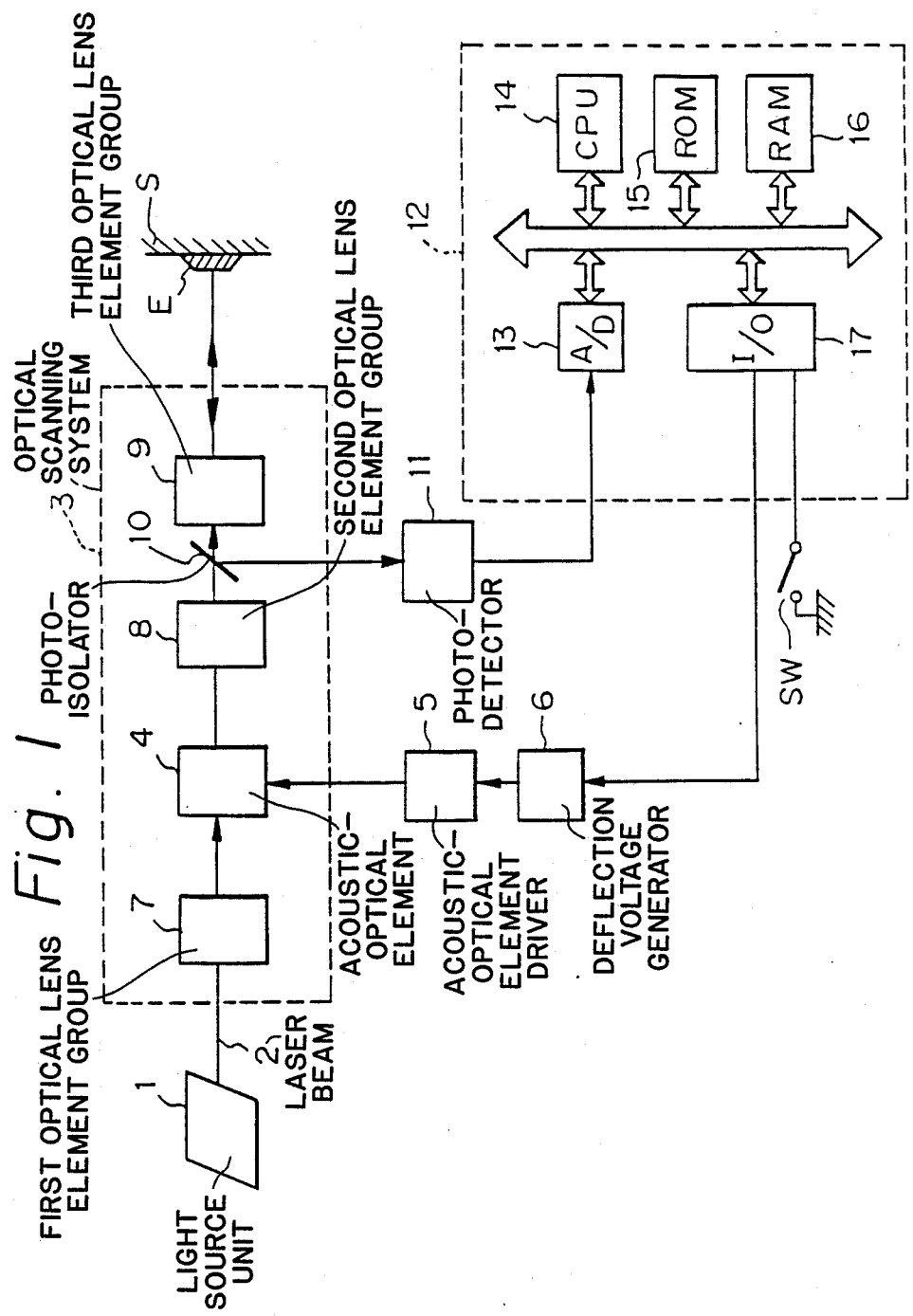
FIG. 1 is a schematic block diagram of a micro-dimensional measurement apparatus according to the present invention.

FIG. 1 shows a block diagram of a micro-dimensional measurement apparatus which is arranged so as to optically measure a dimension between opposed edges of an element E provided on a substrate S.

The apparatus comprises a light source unit 1 for emitting a laser beam 2 having a Gausian distribution, and an optical scanning system 3 for scanning the substrate S with the laser beam 2 so that the laser beam 2 crosses over a measuring zone between the opposed or opposite edges. The high source unit 1 may be arranged so as to generate an He-Ne laser having a wavelength of, for example, 0.633 $\mu$m. In this embodiment, the optical scanning system 3 is constructed substantially in the same manner as disclosed in British Patent No. 2147097 cited hereinbefore, but it is possible to use another type of optical scanning system such as a polygon mirror type scanning system, an electromagnetically driving type scanning system, or the like.

The optical scanning system 3 includes an acoustic-optical element 4 which is well known in this field and which basically comprises an optically transparent medium through which the laser beam 2 is adapted to pass, and an electro-acoustic transducer attached to the optically transparent medium. The acoustic-optical element 4 is actuated by an acoustic-optical element driver 5 so that the laser beam 2 passing through the transparent medium is subjected to deflection therewithin. In particular, when a voltage produced by a deflection voltage generator 6 is supplied to the acoustic-optical element driver 5, a high frequency drive signal is generated which is proportional to a level of the supplied voltage. When the high frequency drive signal is applied to the electro-acoustic transducer, ultrasonic acoustic travelling waves are generated within the transparent medium so that an index of refraction thereof is changed to deflect the laser beam 2 within the transparent medium, whereby the scanning of the substrate S can be carried out by the deflection of the laser beam 2.

The optical scanning system 3 also includes first, second, and third groups of optical lens elements 7, 8, and 9, respectively, and an photo-isolator 10, which may be substituted by a beam splitter. The first group of optical lens elements 7 serves to suitably deform the laser beam 2 just after the laser beam 2 is emitted from the light source 1 in a cross section shape, so that it can be effectively deflected within the transparent medium of the acoustic-optical element 4. The original shape of the deformed and deflected laser beam 2 is then restored by the second group of optical lens elements 8. The third group of optical lens elements 9 serves to focus the laser beam 2 to form a fine beam spot thereof on the substrate S. Since the present invention is mainly directed to a measurement on the order of less than 1 μm as a fine dimension between the opposed edges, the third group of optical lens elements 9 is preferably arranged so that the laser beam 2 is throttled to a diameter of about 1.2 μm. The laser beam 2 is projected from the third group of optical elements 9 onto the substrate S and is then reflected therefrom back to the optical scanning system 3. The photo-isolator 10 is disposed between the second and third groups of optical lens elements 8 and 9, and serves to output the returned laser beam 2 from the optical scanning system 3 while transmitting the laser beam 2 from the second group of optical lens elements 8 to the third group of optical lens elements 9.

As mentioned above, the high frequency drive signal generated by the acoustic-element driver 5 is in proportion to the level of the voltage produced by the deflection voltage generator 6. In other words, a scanning distance travelled by the laser beam 2 over the substrate S can be regulated by varying the level of the voltage supplied from the deflection voltage generator 6 to the acoustic-optical element driver 5. For example, if the optical scanning system 3 is so arranged that the laser beam 2 will travel a scanning distance of 16 μm over the substrate S by applying 1 volt as a deflection voltage to the acoustic-optical element driver 5, it is possible to obtain a scanning distance of 0.016 μm by varying the deflection voltage at each step of 1 m volt. In short, according to the optical scanning system 3, the substrate S is stepwise scanned with the laser beam 2 by varying the level of the deflection voltage at regular intervals.

The micro-dimensional measurement apparatus also comprises a photo detector 11 for detecting an intensity of the laser beam reflected from the substrate S and output from the optical scanning system 3, and a control circuit 12 for commanding an overall operation of the apparatus. The photo detector 11 comprises a photoelectric conversion device such as a PIN photo diode which generates an analog voltage signal in proportion to the intensity of the laser beam 2. The analog voltage signal generated by the detector 11 is transmitted to an analog-to-digital (A/D) converter 13 in the control circuit 12.

The control circuit 12, which may be constructed by a microcomputer as shown in FIG. 1, further comprises a central processing unit (CPU) 14, a read-only memory (ROM) 15 for storing a routine, tables (maps), constants, etc., a random access memory (RAM) for storing temporary data, and an input/output interface (I/O) 17. A start switch SW generates a starting pulse and transmits the pulse to the I/0 interface 17, whereby a routine for measurement is operated.

As can be seen from FIG. 1, the reflection voltage generator 6 is commanded by the control circuit 12 so that the level of the deflection voltage supplied to the acoustic-optical element driver 5 is varied in the manner as mentioned above for carrying out the stepwise scanning operation.

Figure 2A:
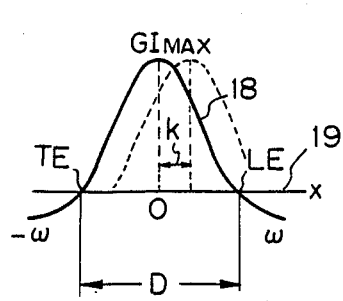
FIG. 2A through FIG. 2F are schematic illustrations for explaining the measurement principle of the present invention.

For a better understanding of the present invention, the principle thereof will be explained as follows:

FIG. 2A shows a Gaussian intensity distribution 18 of the laser beam 2, an intensity GI of which is represented by the formula below:

$$GI = GI_{MAX} exp(-2 \cdot x^2 / \omega^2)$$

wherein $GI_{max}$ is the maximum peak intensity; $\omega$ is a so called Gaussian beam radius which is generally defined as one half of a pitch distance obtained by slicing the Gaussian distribution at the 13.5% level (as shown by a slice line 19) of the maximum peak intensity GIMAX; and x is a distance measured from an origin 0 of the slice line 19. In FIG. 2A, D is the diameter of the Gaussian beam spot ($D = 2 \cdot \omega$).

Figure 2B:
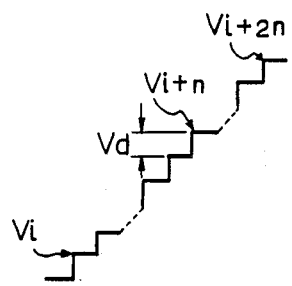

FIG. 2B diagrammatically shows a stepwise increment of the deflection voltage which should be applied from the deflection voltage generator 6 to the acoustic-optical element driver 5. As can be seen from FIG. 2B, the deflection voltage is increase at each occurrence of a voltage difference $V_d$.

Figures 2C, 2D, 2E:
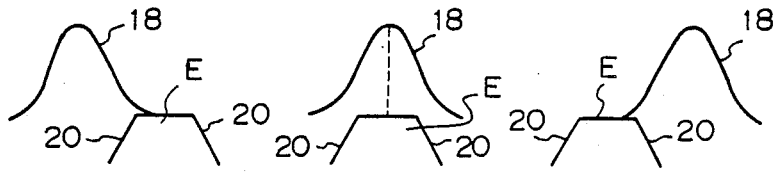

Considering that the element E to be measured is scanned with the laser beam 2 having a spot diameter D which is larger than a dimension between the opposed edges of the element E, three representative scanning stages are given as shown in FIGS. 2C, 2D, and 2E, respectively. In FIG. 2C, a leading edge of the beam spot, indicated by LE in FIG. 2A, abuts against one of the edge lines of the element E. At this point, the deflection voltage is $V_i$ (FIG. 2B). In FIG. 2D, the center of the beam spot (the maximum peak) is positioned at the middle point between the edge lines of the element E. At this point, the deflection voltage is $V_{i+n}$ (FIG. 2B). In FIG. 2E, a trailing edge of the beam spot, indicated by TE in FIG. 2A, is just leaving the other edge line of the element E. At this point, the deflection voltage is $V_{i+2n}$ (FIG. 2B). In other words, when the deflection voltage is stepwise increased from $V_i$ to $V_{i+n}$ (that is, by $n \cdot V_d$), the beam travels a scanning distance equal to $n \cdot k$ over the element E, so that the center of the beam spot (the maximum peak) reaches the middle point between the edge lines. Here, k (FIG. 2A) is a unit of step distance, that is, a distance which the beam travels over the element E at each increment of $V_d$. When the deflection voltage is further stepwise increased from $V_{i+n}$ to $V_{i+2n}$ (that is, by $n \cdot V_d$), the beam travels the same scanning distance (n·k) over the element E. In short, the dimension between the edge lines of the element E is equal to 2·n·k.

Figure 2F:
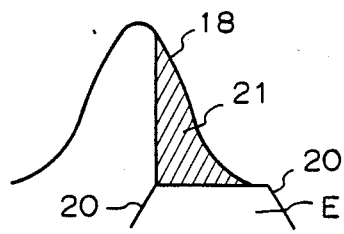

The element E may be an aluminum conductor provided on a substrate of an integrated circuit (not shown). In general, such an aluminum conductor has a trapezoid cross section so that an oblique edge face 20 extends from each of the edge lines toward the substrate surface. Thus, when the beam is projected on one of the edge lines, a portion of the beam which is projected on the measuring zone between the edge lines can be detected by the detector 11 because it is returned to the optical scanning system 3, but the other portion thereof, which is projected on the oblique face, cannot be detected by the detector 11 because it is diverted without returning to the optical scanning system 3. For example, when the deflection voltage is stepwise increased from $V_i$ to $V_{i+m}$ (m°n), so that the beam travels from the position of FIG. 2C to a position as shown in FIG. 2F, only a portion of the beam which corresponds to a hatched area 21 of the Gaussian intensity distribution 18 can be detected by the detector 11.

The detectable portion of the beam which is reflected from the measuring zone between the edge lines at each of the scanning steps has an intensity of reflection which can be obtained by integrating the Gaussian intensity distribution with respect to a scanning distance corresponding to a number of scanning steps. For example, in FIG. 2F, the hatched portion 21 has a reflected light intensity as defined by the formula below:

$$U_{i+m} = \int_{w-(i+m)k}^{w} f(x)\,dx$$

Accordingly, if the Gaussian intensity distribution 18 and the dimension to be measured between the opposed edges are known, it is possible to theoretically calculate a reflected light intensity Ii ($I_0 \ldots I_{i+n} \ldots I_{i+2n}$) at each of the scanning steps. For example, on the supposition that a dimension d between the edges lines of the element E is equal to the diameter D of the beam spot, a relationship between I and a scanning distance SD (a number of scanning steps) can be as shown below:

$$I_0 = 0 : SD = 0$$

$$I_{i-n/2} = \int_0^w f(x)\,dx \text{ (max. value/2)} : SD = (1/2) \cdot n \cdot k = 0.5D$$

$$I_{in+n} = \int_{-w}^{+w} f(x)\,dx \text{ (max. value)} : SD = n \cdot k = D$$

$$I_{i+3n/2} = \int_{-w}^{0} f(x)\,dx \text{ (max. value/2)} : SD = (3/2) \cdot n \cdot k = 1.5D$$

$$I_{i+2n} = 0 : SD = 2D$$

Figure 3:
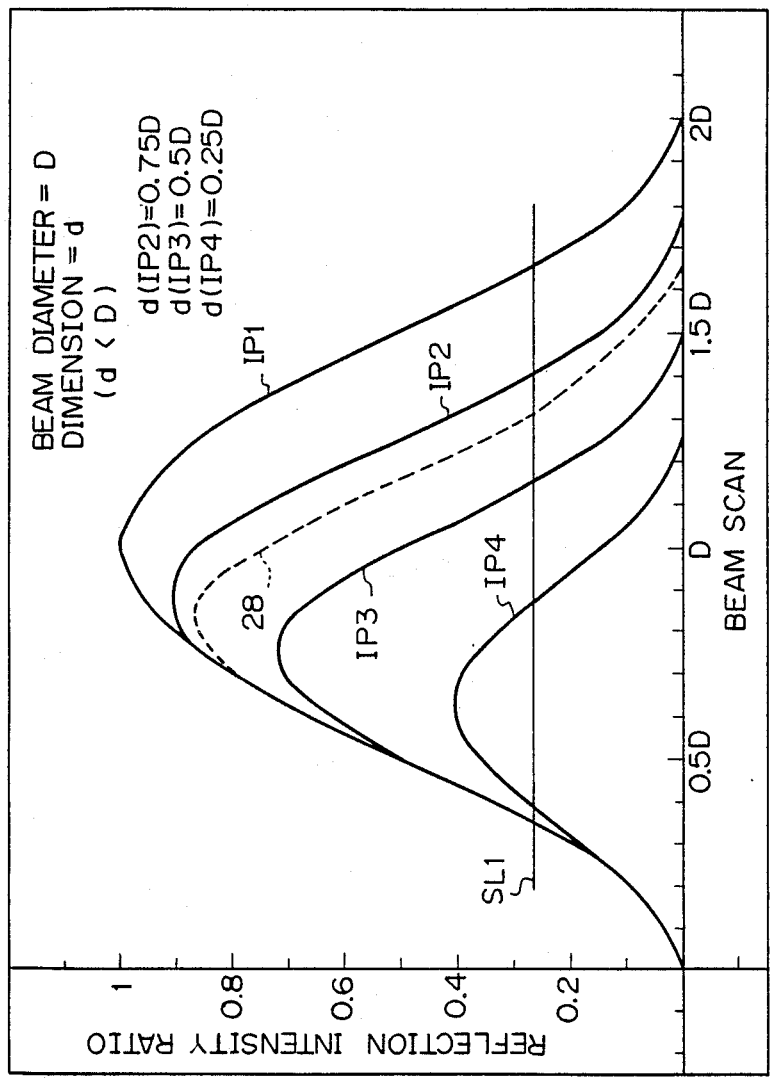
FIG. 3 is a graph for explaining the principle of the invention, showing a series of reflected light intensity patterns derived from various sample dimensions.

On the basis of this relationship, it is possible to prepare a reflected light intensity pattern as indicated by IP 1 in FIG. 3. FIG. 3 further shows other reflected light intensity patterns which are prepared in the same manner as mentioned above with respect to sample dimensions d=0.75D, d=0.5D and d=0.25D, respectively. It should be noted that, in FIG. 3, all of the intensity values on the patterns IP 1, IP 2, IP 3, and IP 4 are normalized with respect to the maximum value of the pattern PI 1 which is assumed to be 1.

Although the reflected light intensity patterns can be theoretically obtained in the above manner, it is possible to obtain these patterns by actually measuring some known sample dimensions in accordance with an operation of the present invention hereinafter. In this case, as apparent from FIG. 3, in order to prepare a reflected light sample pattern on each of the known sample dimensions, at least (D+d) is needed as a scanning distance (D being a spot diameter of a laser beam used, and d being a known sample dimension to be measured). Also, it can be easily understood that, in the reflected light intensity pattern, the maximum peak occurs at (D+d)/2.

The principle of the present invention is based upon the feature that a reflected light intensity pattern obtained from each individual dimension possesses a specific characteristic as shown in FIG. 3. In other words, an unknown dimension can be found by comparing a reflected light intensity pattern obtained therefrom with a series of reflected light intensity patterns obtained from known sample dimensions.

Figure 4:
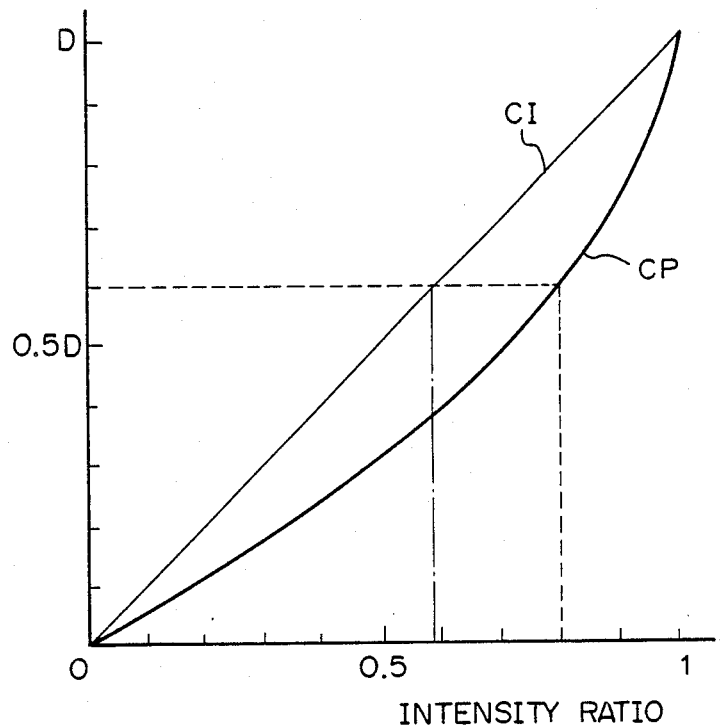
FIG. 4 is a graph showing characteristics of optical peak data and integration data which are obtained from the series of reflected light intensity patterns shown in FIG. 3.

In the present invention, to facilitate the comparison as mentioned above, several kinds of reference data are picked up from the series of reflected light intensity patterns IP 1, IP 2, IP 3, and IP 4. For example, it is possible to obtain two kinds of reference data: one kind of reference data consisting of peak values of the patterns IP 1, IP 2, IP 3, and IP 4, and the other kind of reference data consisting of integrated values thereof. In FIG. 4, a characteristic CP is a curve obtained by plotting the peak values of the patterns IP 1, IP 2, IP 3, and IP 4, and a characteristic CI is a linear line obtained by plotting the integrated values thereof. It should be noted that, in FIG. 4, all of the peak values and integrated values are normalized with respect to the maximum peak and integrated values of the pattern IP 1 which is assumed to be 1.

By using the characteristic CP and characteristic CI, it is possible to easily find an unknown dimension d. For example, if a peak value obtained from the unknown dimension is 0.8, d=0.6D, as indicated by a broken line in FIG. 4. On the other hand, an integrated value obtained from the same dimension d is expected to be 0.58, as indicated by a chain line but, in practice, the value of d found by the peak value frequently is not in accord with that found by the integrated value. In this case, according to the present invention, it is determined whether or not a difference of the values of d found by the peak value and the integrated value, respectively, falls within a permissible range. If the difference falls within the permissible range, a mean value of the different values of d is reckoned as a dimension value to be measured.

As another kind of reference data, it is possible to use slice pitch values which are obtained by slicing the patterns IP 1, IP 2, IP 3, and IP 4 at a predetermined slice level SL 1 (FIG. 3). If the slice pitch values are plotted in FIG. 4 in the same manner as both the peak values and the integrated values, it is possible to find a further value from the unknown dimension d on the basis of the pitch values of the patterns IP 1, IP 2, IP 3, and IP 4. In this case, the dimension value to be measured is determined on the basis of the three values of d which are found by the peak values, the integrated values, and the slice pitch values of the patterns IP 1, IP 2, IP 3, and IP 4, respectively.

Although the element E having the trapezoid cross section is used s an example of diverting the portion of the scanning beam not to be detected at each of the opposed edges of the element E, it is possible to use the present invention for measurement of another element having a vertical face at the opposed edges thereof. However, in this case, the element to be measured must be raised from a substrate thereof so that the substrate surface is out of a focal depth of the projected beam.

In the above-mentioned explanatory example of the principle of the invention, a reflectivity of the measuring zone between the opposed edges is unvariable. In other words, a reflectivity of the other zone except for the measuring zone is zero in the sense that a portion of the beam which is reflected outside of the measuring zone is not detected.

The principle of the present invention will be further explained with reference to another example in which a reflectivity of a measuring zone to be scanned with the beam is variable.

Figure 5A:
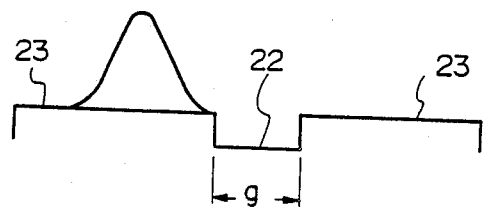
FIGS. 5A, 5B and 5C are schematic illustrations for explaining the measurement principle of the present invention.
Figure 5B:
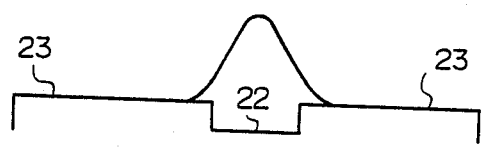
Figure 5C:
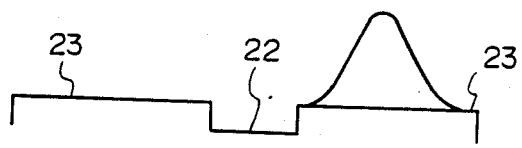

FIGS. 5A, 5B, and 5C, corresponding to FIGS. 22C, 2D, and 2E, respectively, show a process for measuring a dimension g between opposed edges of a fine gap in substantially the same manner as explained in the first example. The fine gap may be formed in a substrate, or may be formed between two magnet portions of a magnetic head which is used in a magnetic recorder and a magnetic reproducer. It is assumed in this example that a measuring zone 22 between the gap edges has a lower reflectivity than that of the land portions 23, but of course, there is no intention of excluding a case wherein the gap zone 22 has a higher reflectivity than that of the land zones 23.

Figure 6B:
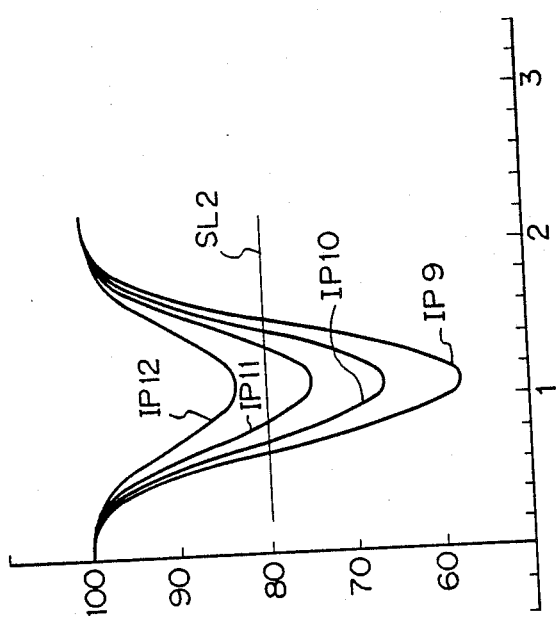
FIGS. 6A and 6B are graphs for explaining the principle of the invention, showing a series of reflected light intensity patterns derived from various sample dimensions and sample reflectivities.
Figure 6A:
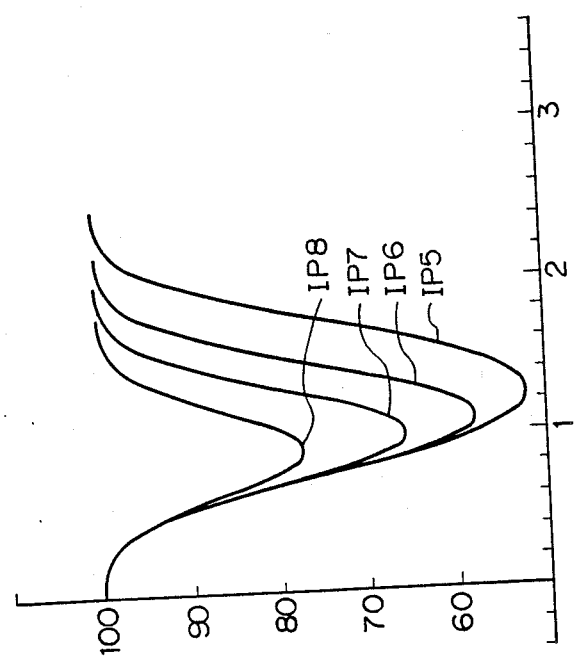

In the second example, since the reflectivity of the gap zone 22 is variable, a series of reflected light intensity patterns which correspond to the patterns IP 1, IP 2, IP 3, and IP 4 must be prepared with respect to sample gap dimensions g, respectively, for each of the sample reflectivities r. FIG. 6A shows a series of reflected light intensity patterns IP 5, IP 6, IP 7, and IP 8 which are prepared with respect to sample gap dimensions g=1.0, 0.7, 0.5, and 0.3, respectively, the reflectivity of the gap zone 22 being fixed as r=0.5. On the other hand, FIG. 6B shows a series of reflected light intensity patterns IP 9, IP 10, IP 11, and IP 12 which are prepared with respect to sample reflectivities r=0.5, 0.6, 0.7, and 0.8, respectively, the gap dimension being fixed as g=0.7. In FIGS. 6A and 6B, it should be noted that the sample reflectivities r are normalized with respect to a reflectivity of the land zones 23, which is assumed to be 1; that the sample gap dimensions g are normalized with respect to the diameter D of the Gaussian beam spot, which is assumed to be 1; and that the reflected light intensities I of all of the patterns are normalized with respect to a reflected light intensity of the land zones 23, which is assumed to be 100.

As mentioned above, in the second example, it is assumed that the reflectivity of the gap zone 22 is lower than that of the land zones 23. Accordingly, the reflected light intensity patterns all have a minimum peak value, as apparent from FIGS. 6A and 6B.

Figure 7:
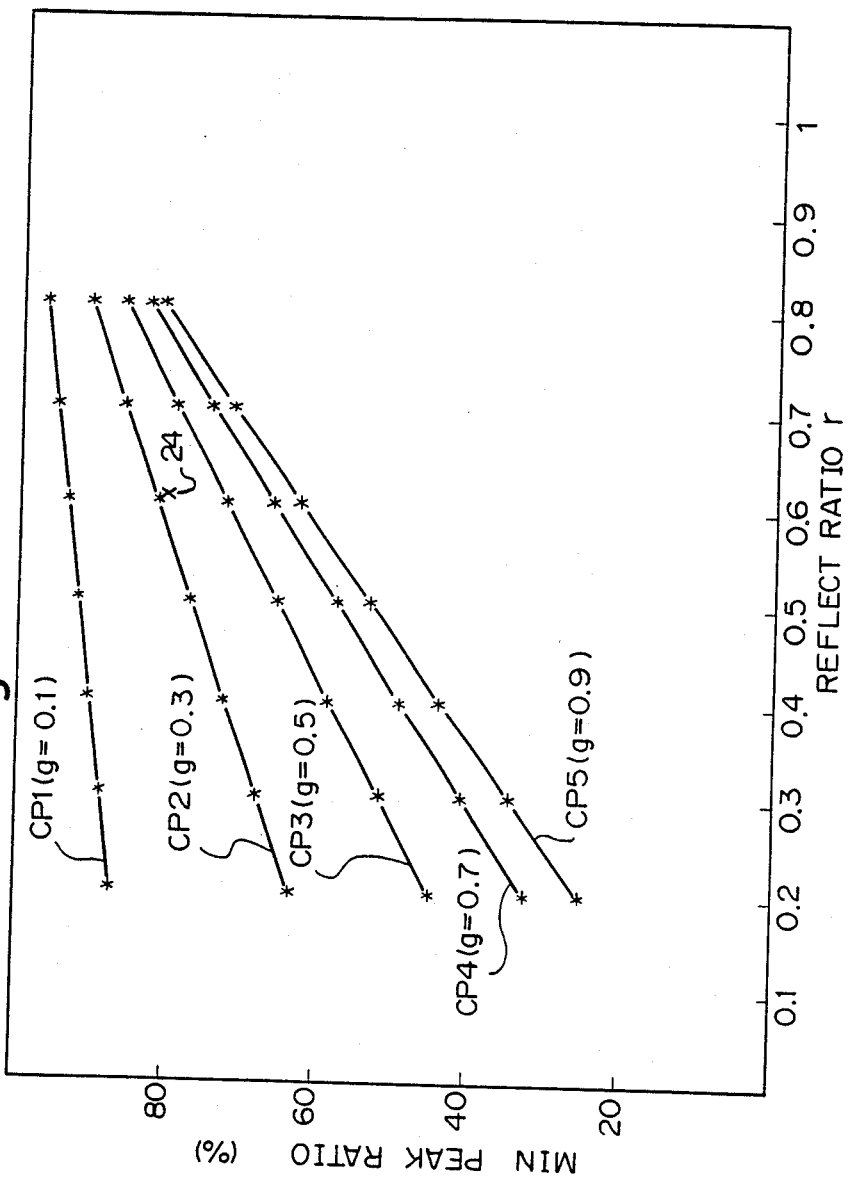
FIG. 7 is a graph showing characteristics of optical peak data obtained from the series of reflected light intensity patterns shown in FIGS. 6A and 6B.

As a kind of reference data, minimum data peak values are picked up from the series of reflected light intensity patterns which are prepared with respect to the sample dimensions d, respectively, of each of the sample reflectivities r, as shown by way of example in FIGS. 6A and 6B. FIG. 7 shows characteristics CP 1, CP 2, CP 3, CP 4, and CP 5 obtained by plotting the minimum peak values with respect to the sample reflectivities r.

Figure 8:
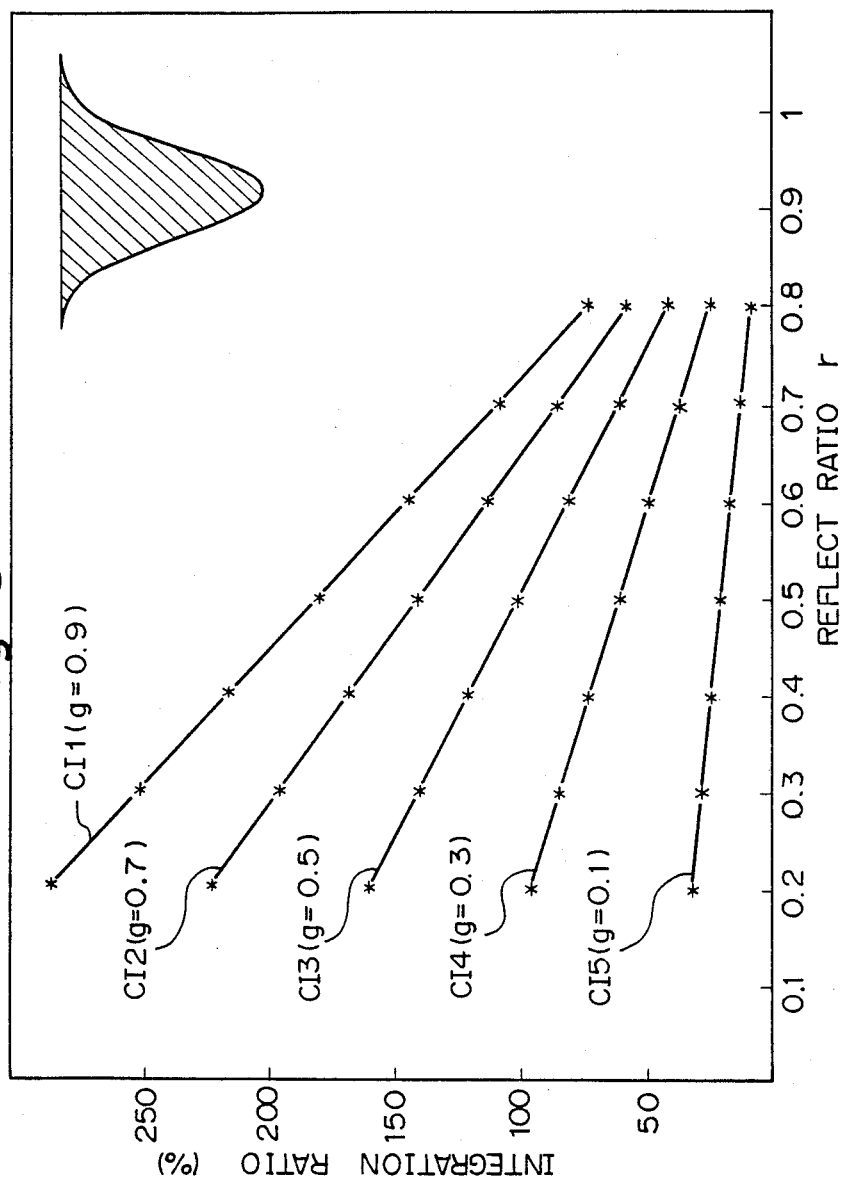
FIG. 8 is a graph showing characteristics of optical integration data obtained from the series of reflected light intensity patterns shown in FIGS. 6A and 6B.

As another kind of reference data, integrated values are also picked up from the series of reflected light intensity patterns as mentioned above. FIG. 8 shows characteristics CI 1, CI 2, CI 3, CI 4, and CI 5 obtained by plotting the integrated values respect to the sample reflectivities r. In this case, it should be noted that each of the integrated value is equal to an inward area of the corresponding reflected light intensity pattern, as shown diagrammatically in FIG. 8 (hatched area). Also, in FIG. 8, the integrated value is assumed to be 100, which is calculated from the reflected light intensity pattern derived from the sample dimension d of 0.5 and the sample reflectivity r =0.5.

Figure 9:
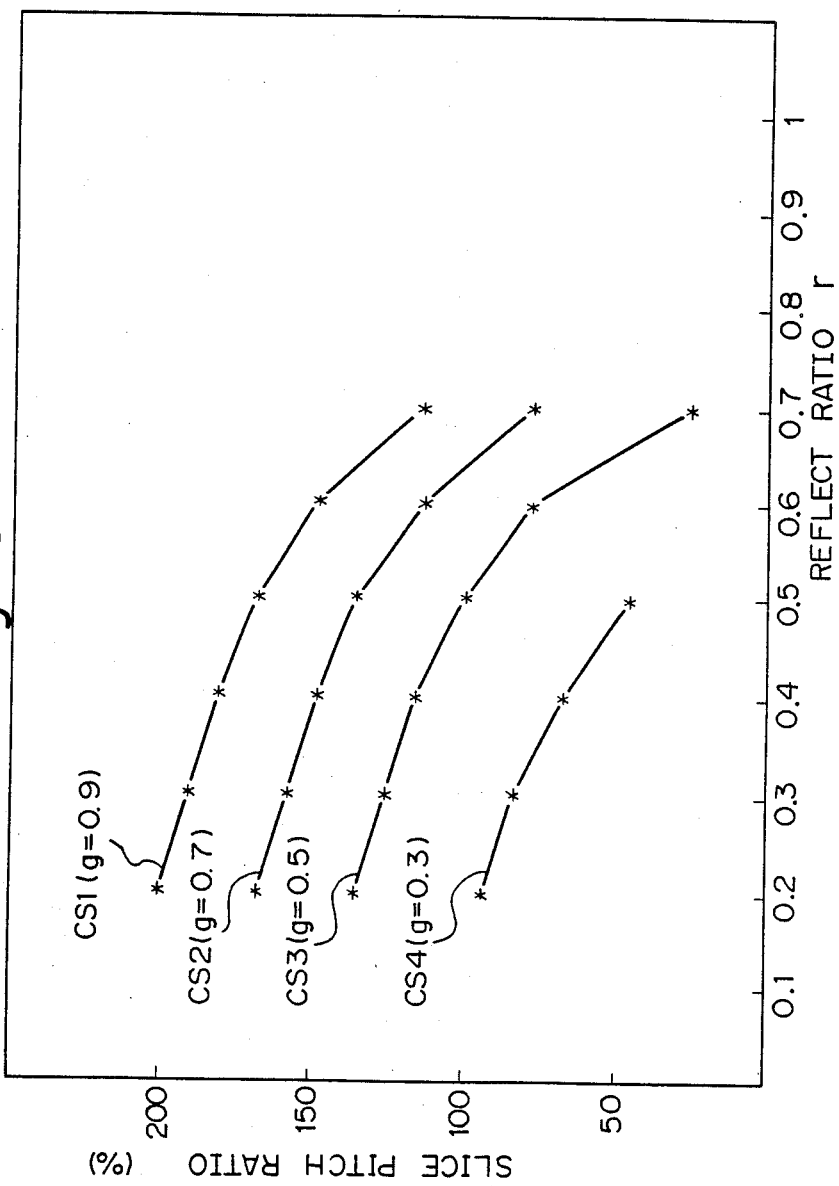
FIG. 9 is a graph showing characteristics of optical slice pitch data obtained from the series of reflected light intensity patterns shown in FIGS. 6A and 6B.

As a third kind of reference data, slice pitch values are further picked up from the series of reflected light intensity patterns by slicing these patterns at a predetermined slice level as indicated by way of example by SL 2 in FIG. 6B. FIG. 9 shows characteristics CS 1, CS 2, CS 3, and CS 4 obtained by plotting the slice pitch values with respect to the sample reflectivities r. In FIG. 9, the slice pitch value is assumed to be 100, which is calculated from the sample dimension g of 0.5 and the sample reflectivity r=0.5.

If at least two of the three kinds of data, namely, a minimum peak value, an integrated value, and a slice pitch value are obtained from a reflected light intensity pattern prepared on n unknown gap dimension g, and if a reflectivity r of the gap zone to be scanned is previously known by, for example, carrying out an actual measurement, it is possible to find two values of the unknown dimension g from the at least two kinds of data, respectively, so as to calculate a value to be measured of the unknown dimension g on the basis of the at least two values of the gap dimension g in substantially the same manner as in the first example. In particular, for example, if a minimum peak value obtained from the unknown gap dimension g is 80%, and if the known reflectivity r is 0.6, a point is plotted as indicated by reference numeral 24 in FIG. 7. In this case, a characteristic representing the plotted point 24 can be obtained from the characteristics CP2 and SP 3 by an interpolation method. In this way, one value of the gap dimension g can be found from the characteristics CP 1, CP 2, CP 3, CP 4, and CP 5. Similarly, it is possible to find another value of the gap dimension g from each of FIGS. 8 and 9. According to the present invention, by using at least two of the three values so obtained, it is possible to carry out the measurement of the gap dimension g with a high accuracy and reliability.

Figure 10:
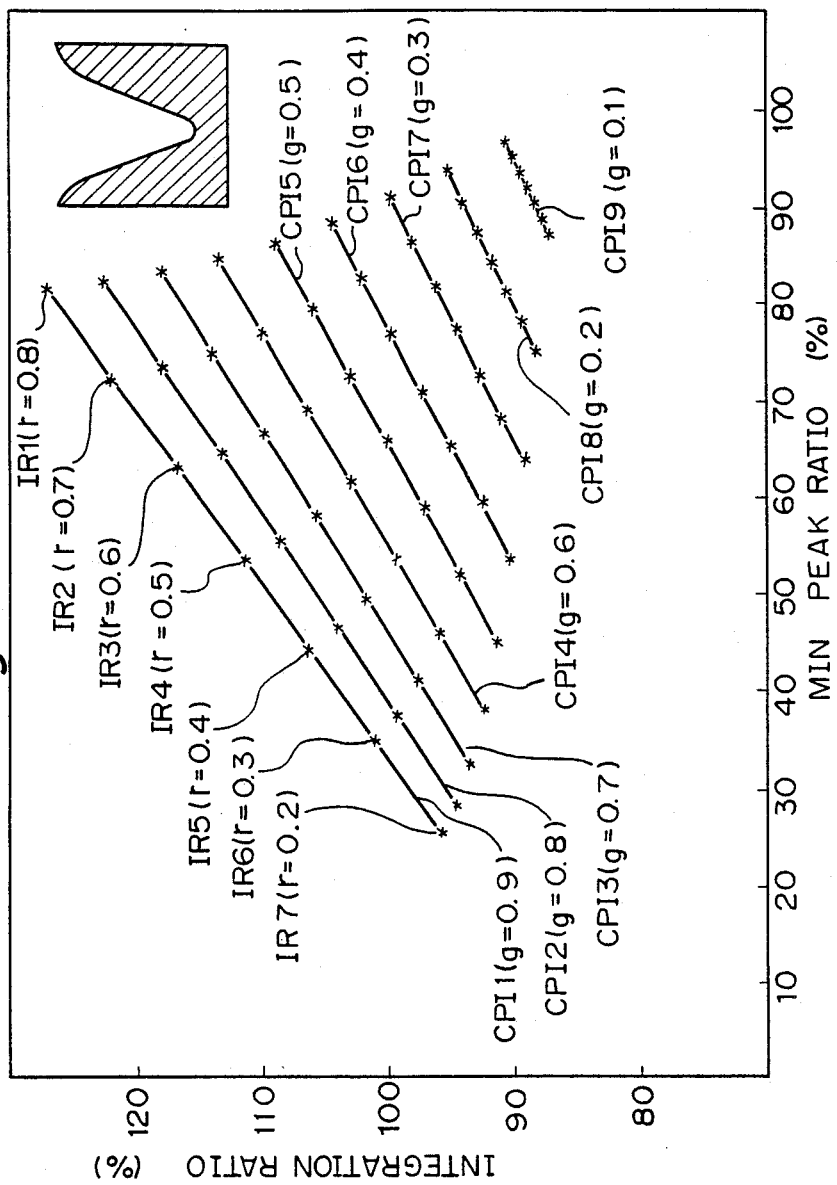
FIG. 10 is a graph showing characteristics of a combined optical peak/integration data obtained from the series of reflected light intensity patterns shown in FIGS. 6A and 6B.

Even if it is impossible to determine a reflectivity of the gap zone to be scanned, the measurement can be carried out by all of the three kinds of reference data consisting of the minimum peak values, the integrated values, and the slice pitch values, respectively. FIG. 10 shows characteristics CPI 1, CPI 2, CPI 3, CPI 4, CPI 5, CPI 6, CPI 7, CPI 8, and CPI 9 obtained by plotting the minimum peak values and the integrated values as a parameter of the sample gap dimensions g and the sample reflectivities r. It should be noted that, in FIG. 10, each of the integrated values is equal to the outward area value of the corresponding reflected light intensity pattern, as shown diagrammatically in FIG. 10 (hatched area). This is because the characteristics CPI 1 to CPI 9 are better arrayed as shown in FIG. 10 than when using an inward area of the reflected light intensity patterns. Note, FIG. 11 shows characteristics obtained by using the inward area of the reflected light intensity patterns.

Figure 12:
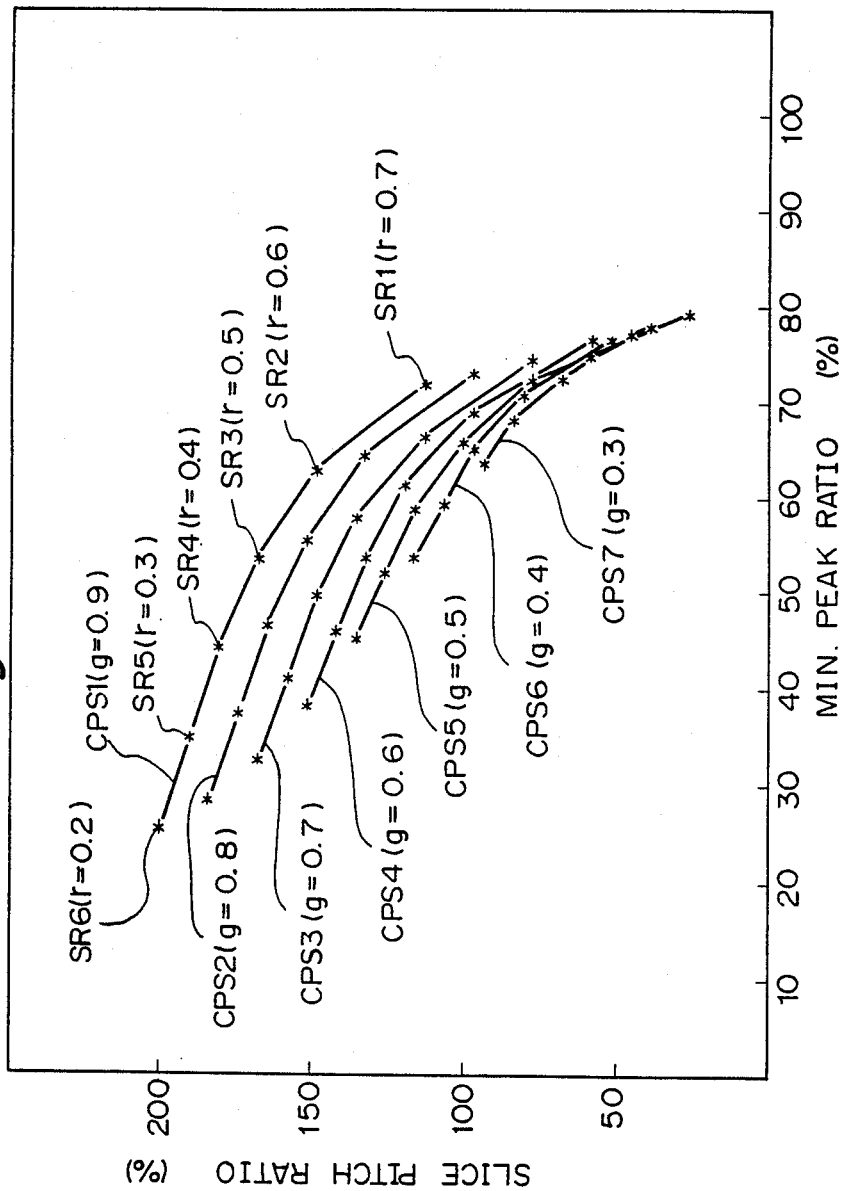
FIG. 12 is a graph showing characteristics of a combined optical slice pitch/integration data obtained from the series of reflected light intensity patterns shown in FIGS. 6A and 6B.

FIG. 12 shows characteristics CPS 1, CPS 2, CPS 3, CPS 4, CPS 5, CPS 6, and CPS 7 obtained by plotting the minimum peak values and the slice pitch values as a parameter of the sample gap dimensions g and the sample reflectivities r.

It can be easily understood that, if a minimum peak value, an integrated value, and a slice pitch value are obtained from a reflected light intensity pattern prepared on an unknown gap dimension g, it is possible to determine value of the unknown dimension g from FIGS. 10 and 12, respectively, by an interpolation method, so as to reckon value to be measured of the gap dimension g on the basis of the two values of the gap dimension g, in the same manner as in the first example.

Figure 11:
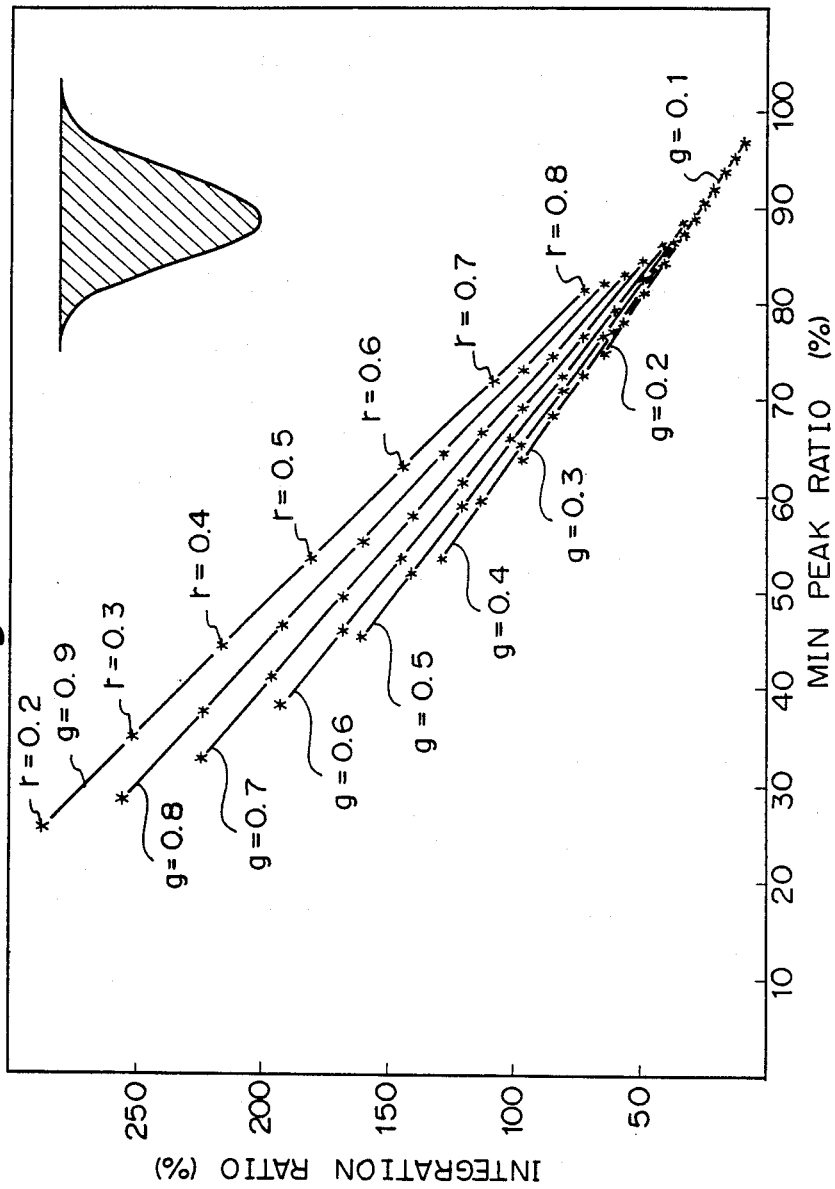
FIG. 11 is a graph showing characteristics of another combined optical peak/integration data obtained from the series of reflected light intensity patterns shown in FIGS. 6A and 6B.

In addition, as can be seen from FIGS. 10, 11, and 12, each of the characteristics shown therein includes information on the reflectivities r of the gap zone t be scanned. In other words, it is also possible to use the characteristics for finding value of the unknown reflectivity r. In FIG. 10, a point IR 1 of the characteristic CPI 1 and the corresponding points of the other characteristics CPI 2 to CPI 9 form a characteristic of reflectivity representing r=0.8. The same is true for each of the other points IR 2 to IR 7. Similarly, in FIG. 12, a point SR 1 of the characteristic CPS 1 and the corresponding points of the other characteristics CPS 2 to CPS 7 form a characteristic of reflectivity representing r=0.7. The same is true for each of the other points SR 2 to SR 6.

The principle of the present invention will be further explained with reference to a third example, in which a measurement of a fine dimension between the opposed edges is carried out by detecting a position of the opposed edges.

When a dimension between the opposed edges of the element E is smaller than the diameter D of the beam spot and is larger than one half of the spot diameter D, a reflected light intensity pattern derived from such a dimension theoretically includes two points of inflection and two kink points.

In particular, FIG. 13A shows a reflected light intensity pattern 25 which is obtained by scanning the element E having the dimension 0.8D. FIG. 13B shows a scanning stage at which the maximum peak of the beam is in accord with one of the opposed edges of the element E. At this point, a rate of change of an increment of intensity of the reflected light reaches a maximum, as can be easily understood from FIG. 13B. Therefore, the scanning stage of FIG. 13A corresponds to one of the two points of inflection on the reflected light intensity pattern 25, this inflection point being indicated by a reference numeral 26.

FIG. 13C shows a scanning step succeeding the scanning step of FIG. 13B, whereby the leading edge of the beam spot abuts against the other edge of the element E. When a scanning stage advances further from the scanning stage of FIG. 13C, the leading edge of the beam spot leaves the other edge of the element E so that a portion of the beam which is outside of the other edge of the element E cannot be detected. Therefore, at the scanning stage of FIG. 13C, a discontinuous change occurs in the increment of intensity of the reflected light. That is, the scanning stage of FIG. 13C corresponds to one of the two kink points; this kink point being indicated by a reference numeral 27.

The other point 26' of the two inflection points as well as the other point 27' of the two kink points also appear for the same reasons as the inflection point 26 and the kink point 27, except that the rate of change of a decrement of intensity of the reflected light becomes minimum at the inflection point 26', and that a discontinuous change occurs n the decrement of intensity of the reflected light. Note, it can be easily understood that the two inflection points and the two kink points are in accord with each other in a reflected light intensity pattern derived from the element E having the dimension 0.5D.

In FIG. 3, each of the reflected light intensity pattern IP 2, IP 3, and IP 4 has one of the two kink points at the point where the pattern branches off from the pattern IP 1 derived from the element E having the dimension 1.0D. A reflected light intensity pattern 28 by a broken line in FIG. 3 is derived from the element E having the dimension 0.65D. As can be seen from FIG. 3, the reflected light intensity patterns derived from the elements E having a dimension greater than 0.65D have the two kink points which appear at a level higher than the 0.75 intensity ratio. In other words, these reflection intensity patterns have two inflection points which appear at a level lower than the 0.75 intensity ratio. Therefore, the two portions of the reflected light intensity patterns concerned, which correspond to the range of from the 0.25 intensity ratio to the 0.75 intensity ratio, can be properly represented by a three-dimensional function based upon a method of the least squares because these portions do not include a kink point. In FIG. 13A, the two portions are indicated by a left range LR and a right range RR, respectively.

In short, this means that the element E having a dimension greater than 0.65D (even if the dimension is less than D) can be measured by using the measuring method disclosed in British Patent No. 2147097 cited hereinbefore.

FIG. 14A shows a reflected light intensity pattern 29 derived from the element E having the dimension 0.4D. As apparent from FIG. 14B, before the maximum peak of the beam reaches one of the opposed edges of the element E, the leading edge of the beam spot arrives at the other of the opposed edges. The two point of inflection do not appear in the reflected light intensity pattern 29. In short, the reflected light intensity derived from the element E having a dimension smaller than 0.5D includes only the two kink points 30 and 30'.

When the reflected light intensity pattern 29 is arithmetically processed in a microcomputer, so that it is differentiated twice, a remarkable change occurs at the two kink points thereof and thus it is possible to easily detect these two kink points.

Figure 15:
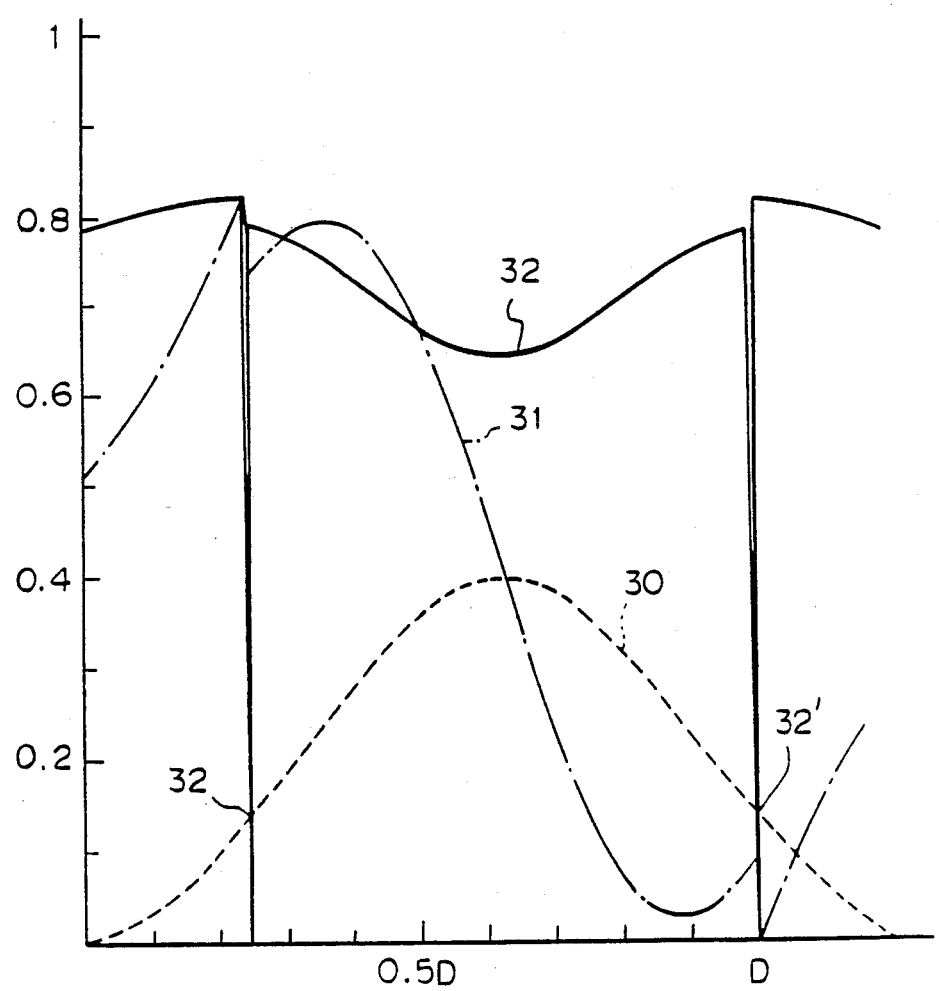
FIG. 15 is a schematic illustration for further explaining the measurement principle of the present invention.

In particular, in FIG. 15, a reflected light intensity pattern 30 shown by a broken line is derived from the element E having the dimension 0.25D, and a pattern 31 shown by a chain dotted line is obtained by once differentiating the reflected light intensity pattern 30. As shown in FIG. 15, the once differentiated pattern 31 includes two discontinuous points which correspond to the two kink points 32 and 32' of the reflected light intensity pattern 30, respectively. When the pattern 31 is prepared from the reflected light intensity pattern 30, the discontinuous points are represented by a minus value. However, it is difficult to detect the discontinuous points by the representation of a minus value because the decremented portions of the reflected light intensity pattern 30 are also represented by a minus value.

In FIG. 15, a pattern 32" shown by a solid line is obtained by further differentiating the pattern 30. As apparent from FIG. 15, the twice differentiated pattern 32" also has two discontinuous points which correspond to the kink points 32 and 32' Thus, when the pattern 32 is prepared from the once differentiated pattern 31, the points are again represented by a minus value, but this representation is unique. Therefore, it is possible to easily detect the two kink points of the reflected light intensity pattern 30 by differentiating the pattern 30 twice.

In short, when the element E has a dimension greater than 0.5 D, it is possible to measure a dimension of the element E y detecting the two kink points of a reflected light intensity pattern derived therefrom.

On the other hand, the reflected light intensity pattern derived from the element E having a dimension of from 0.5 D to 0.65 D includes two inflection points and two kink points which are very close to each other. In this case, a measurement on such a dimension can be carried out y using the twice differentiation method because it is possible to detect the unique change at the kink points as mentioned above.

To determine whether or not a dimension between the opposed edges of the element E to be measure is larger than 0.65D, it is possible to utilize the characteristics CI and/or CP as shown in FIG. 4. For example, when a peak value obtained from the element E to be measured has a higher intensity ratio than the 0.83 intensity ratio of the characteristic CI which corresponds to 0.65D, the element E is measured by detecting the two points of inflection thereof. If the peak value is lower than the 0.83 intensity ratio, the element E is measured by detecting the two kink points thereof.

The operation of the control circuit 12 of FIG. 1 will be now explained.

Figure 16:
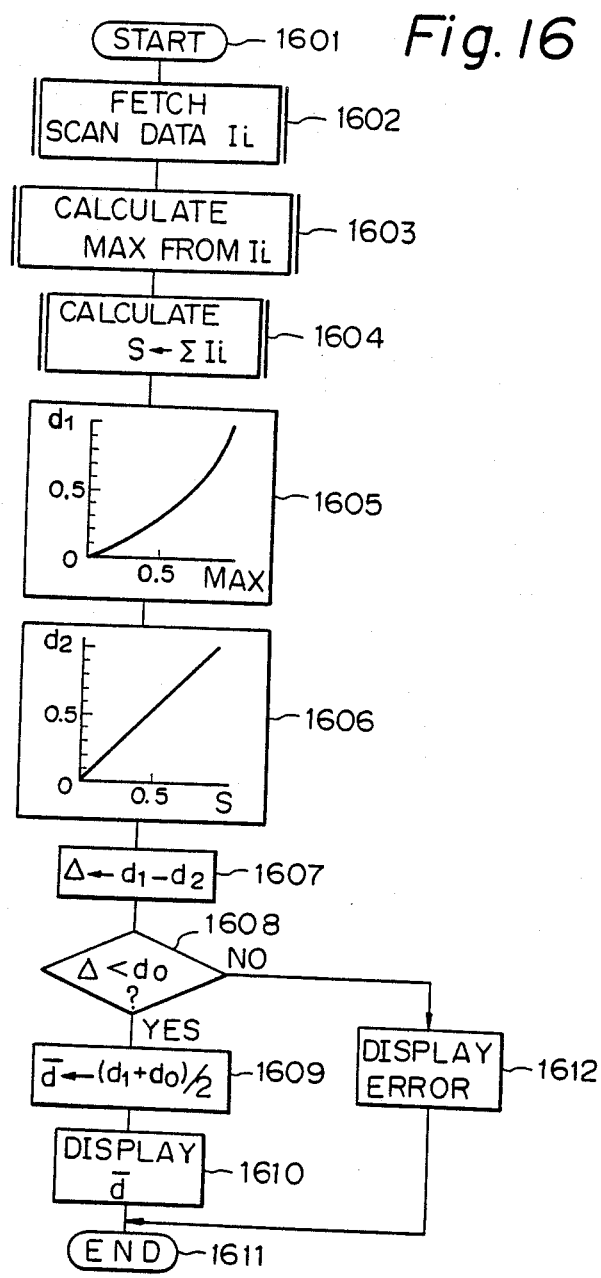
FIGS. 16 to 27 are flow charts showing the operation of the control circuit of FIG. 1.

FIG. 16 is a routine for calculating a dimension between the opposed edges of the element E from a peak value and an integrated value obtained from a reflected light intensity data pattern derived from the element E.

The control i entered into step 1601 by pushing a start button of the switch SW.

The control then proceeds to step 1602 in which scan data I is fetched. As apparent from the foregoing, the optical scanning system 3 scans the element E stepwise, with the laser beam under the control of the control circuit 12. The scan data I comprises an intensity of the laser beam reflected from the element E at each of the scanning steps. By way of example, assuming that the scanning operation needed for measuring the element E consists of one hundred scanning steps and one hundred scan data Ii ($i=0\sim 99$). The detector 11 detects the scan data Ii and outputs the data Ii as an analog voltage signal which is proportional to the intensity of the scan data Ii. The analog voltage signal is transmitted to the A/D 13 converter so that the scan data Ii is fetched as digital data by the A/D converter 13. The fetched scan data I0 to I99 forms the reflected light intensity data pattern derived from the element E. In addition, the scan date I0 to I99 may be smoothed, if necessary. The scan data fetching step 1602 will be explained hereinafter in detail with reference to FIG. 17.

Then, the control proceeds to step 1603, which calculates a maximum scan data MAX from the scan data Ii; the maximum scan data corresponding to the peak value of the reflected light intensity data pattern. The MAX calculating step 1603 will be explained hereinafter in detail with reference to FIG. 18.

The control then proceeds to step 1604, which calculates an integrated value of the reflected light intensity data pattern, that is, $S=\Sigma Ii$. The S calculating step 1604 will be explained hereinafter in detail with reference to FIG. 19.

At stp 1605, $d_1$ is calculated from a one-dimensional map by using the parameter MAX. The one-dimensional map corresponds to the characteristic CP. Accordingly, the calculated $d_1$ may be taken as the dimension between the opposed edges of the element E.

At step 1606, $d_2$ is calculated from a one-dimensional map by using the parameter MAX. The one-dimensional map corresponds to the characteristic CI. Accordingly, the calculated $d_2$ may be reckoned as the dimension between the opposed edges of the element E.

The control further proceeds to step 1607, in which a difference $\Delta$ between $d_1$ and $d_2$ is calculated.

At step 1608, it is determined whether or not the difference $\Delta$ is smaller than a predetermined value $d_0$. As a result, if $\Delta < d_0$, the control proceeds to step 1609, which calculates the means value d of $d_1$ and $d_2$ as follows.

$$\overline{d} \leftarrow (d_1 + d_2)/2$$

At step 1610, d is displayed on the display unit (not shown).

This routine of FIG. 16 is completed by step 1611.

On the other hand, at step 1608, if $\Delta \geq d_0$, the control proceeds to step 1612 in which an error for indicating the impossibility of measurement is displayed on the display unit, and then proceeds to step 1611.

When the error is displayed, that is, when $d_1$ and $d_2$ do not fall within the permissible range ($d_0$), two main cases may be considered as factors leading to the error display: one, the measurement is carried but under adverse circumstances such a vibration, impact or the like; and two, that dirt, dust or the like is stuck on the element E and/or the element E per se has blemishes at the edges and/or on the surface thereof. Accordingly, when the error is displayed, preferably the measurement is repeated. If the error display results from the former factor, it can be cleared. Conversely, if the error is again displayed, the element E may be considered to be an inferior product.

Figure 17:
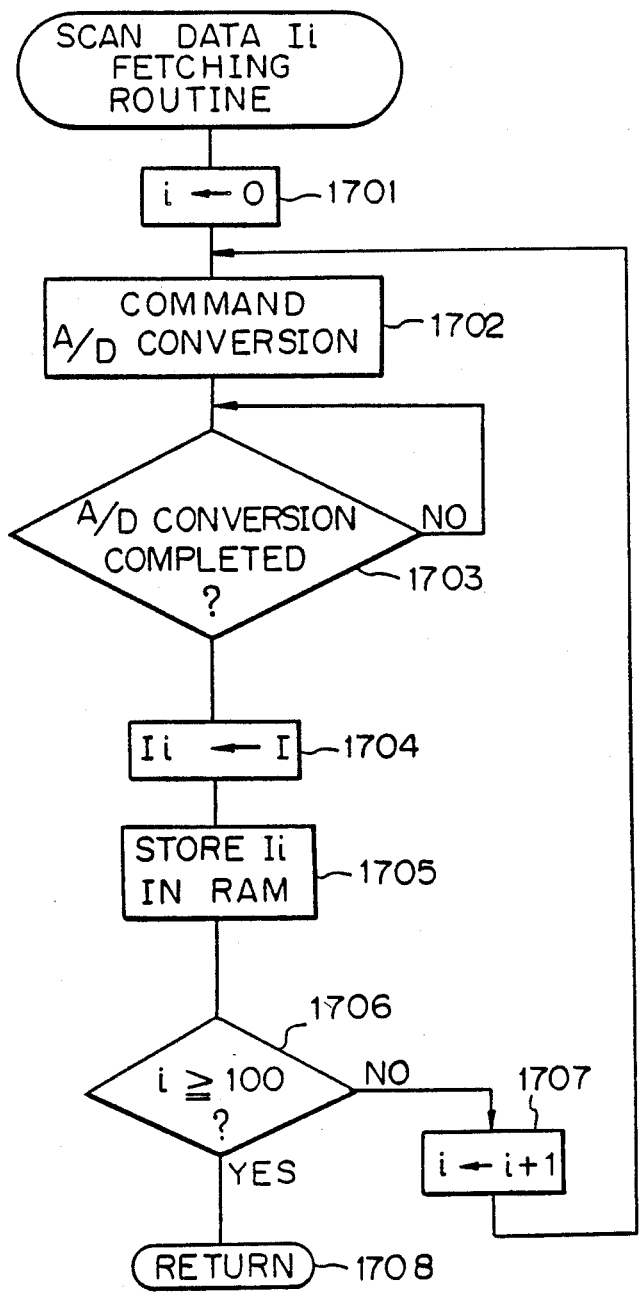

FIG. 17 shows a routine for fetching the scan data I.

At step 1701, a counter i is reset.

The control then proceeds to step 1702 in which the CPU 14 generates an A/D conversion start command and transmits the command to the A/D converter 13.

At step 1703, the CPU 14 waits for a completion of an A/D conversion in the A/D converter 13. This is because the CPU 14 also commands the deflection voltage generator 6 to actuate the acoustic-optical element driver 5 to control scanning operation of the optical scanning system 3. When the A/D conversion is completed, the control proceeds to step 1704.

Step 1704 causes the scan data I to be $I_i$.

At step 1705, $I_i$ is stored in the RAM 16.

At step 1706, if $i<100$, the control proceeds to step 1707, in which the counter i is counted up by +1. Thus, steps 1702, 1703, 1704, 1705, and 1706 are repeated until the counter i is counted up by +100 at step 1707.

At step 1707, when the counter i is counted up by +100, the control proceeds to step 1708 and then returns to step 1603 of FIG. 16. As a result, all of the scan data $I_0$ to $I_{99}$ are stored in the RAM 16.

Figure 18:
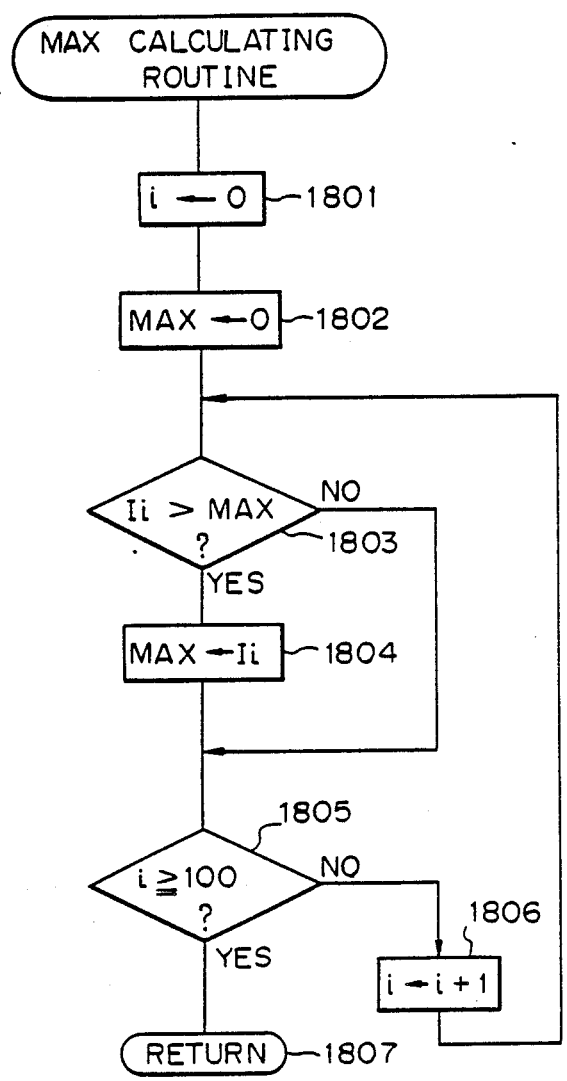

FIG. 18 shows a routine for calculating MAX from the scan data $I_i$.

At step 1801, the counter i is reset.

The control proceeds to step 1802 which causes MAX to be 0.

At step 1803, it is determined whether or not I is larger than MAX. If $I_i > $ MAX, the control proceeds to step 1804, which causes MAX to be $I_i$.

At step 1805, it is determined whether or not i is larger than 100. If $i < 100$, the control proceeds to step 1806 in which the counter i is counted up by +1. On the other hand, at step 1803, if $I_i < $ MAX, the control proceeds to step 1805. Thus, steps 1803, 1804, and 1805 are repeated until the counter i is counted up by +100 at step 1806.

At step 1806, when the counter i is counted up by +100, the control proceeds to step 1807 and then returns to step 1604 of FIG. 16. As a result, the maximum scan data is stored in MAX.

Figure 19:
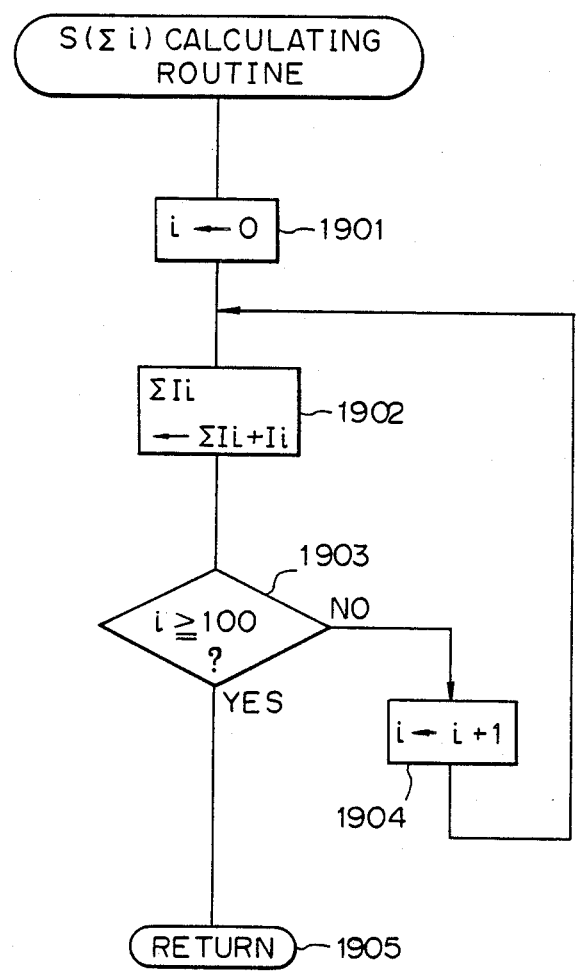

FIG. 19 shows a routine for calculating $$S\left(\sum_{i=0}^{i=99} I_i\right)$$

from the scan data $I_i$.

At step 1901, the counter i is reset.

The control then proceeds to step 1902 which calculates a value of $$S = \sum_{i=0}^{i=99} I_i$$

by $$\Sigma I_i \leftarrow \Sigma I_i + I_i$$

At step 1903, if $i < 100$, the control proceeds to step 1904 in which the counter i is counted by +1. Thus, steps 1902 and 1903 are repeated until the counter i is counted up by +100 at step 1904.

At step 1904, when the counter i is counted up by +100, the control proceeds to step 1905 and then returns to step 1605 of FIG. 16. As a result, $$S = \sum_{i=0}^{i=99} I_i$$

is stored in S.

Figure 20:
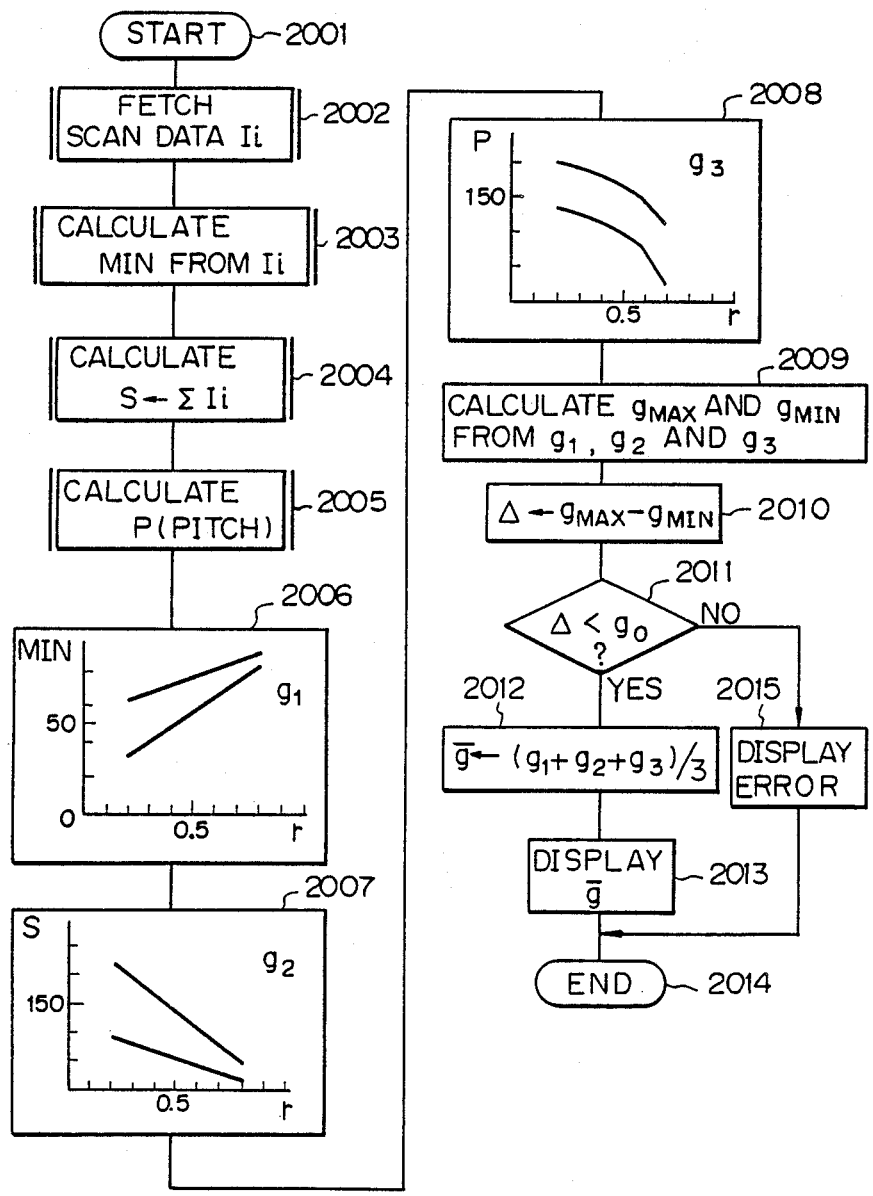

FIG. 20 shows a routine for calculating a dimension of a gap g, as shown in FIG. 5, from a minimum peak value, an integrated value, and a slice pitch value, which are obtained from a reflected light intensity pattern derived from the gap g.

The control is entered into step 2001 by pushing the start button of the switch SW.

The control then proceeds to step 2002 in which one hundred scan data $I_0$ to $I_{99}$ are fetched in the same manner as in step 1602 of FIG. 16. The fetched scan data $I_0$ to $I_{99}$ represent the reflected light intensity pattern derived from the gap g.

Then, the control proceeds to step 2003, which calculates a minimum scan data MIN from the scan data $I_i$; the minimum scan data corresponding to the minimum peak value of the reflected light intensity pattern. The MIN calculating step 2003 will be explained hereinafter in detail with reference to FIG. 21.

The control proceeds to step 2004 in which an integrated value of the reflected light intensity pattern, that is, $$S = \sum_{i=0}^{i=99} I_i,$$

is calculated in the same manner as in step 1604 of FIG. 16.

The control then proceeds to step 2005 in which a slice pitch value P is calculated from the reflected light intensity pattern b slicing the pattern at a predetermined intensity level, as shown in FIG. 6B. The slice pitch calculating step 2004 will be explained hereinafter in detail with reference to FIG. 22.

At step 2006, $g_1$ is calculated from a two-dimensional map by using the parameters of MIN and r wherein r is a reflectivity of the gap zone. Note that a value of the reflectivity r is measured before the measurement of a gap dimension. The two-dimensional map corresponds to FIG. 7. Accordingly, the calculated $g_1$ may be taken as the gap dimension to be measured.

At step 2007, $g_2$ is calculated from a two-dimensional map by using the parameters of S and r. The two-dimensional map corresponds to FIG. 8. Accordingly, the calculated $g_2$ may be taken as the gap dimension to be measured.

At step 2008, $g_3$ is calculated from a two-dimensional map by using the parameters of S and r. The two-dimensional map corresponds to FIG. 9. Accordingly, the calculated $g_3$ may be taken as the gap iimension to be measured.

At step 2009, calculations are carried out to determine a maximum g and a minimum g among the calculated $g_1$, $g_2$, and $g_3$.

At step 2010, a difference $\Delta$ between $g_{MAX}$ and $g_{MIN}$ is calculated by $$\Delta = g_{MAX} - g_{MIN}$$

At step 2011, it is determined whether or not the difference $\Delta$ is smaller than a predetermined value $g_0$. If $\Delta < g_0$ ($g_0 =$ constant), the control proceeds to step 2012 which calculates the means value g of $g_1$, $g_2$, and $g_3$ by $$g \leftarrow (g_1 + g_2 + g_3)/3$$

At step 2013, g is displayed on the display unit.

This routine of FIG. 20 is completed by step 2014.

On the other hand, at step 2011, if $\Delta > g_0$, the control proceeds to step 2015 in which an error for indicting the impossibility of measurement is displayed on the display unit, and then proceeds to step 2014. In this case. preferably the measurement is repeated for the same reasons as mentioned above.

Figure 21:
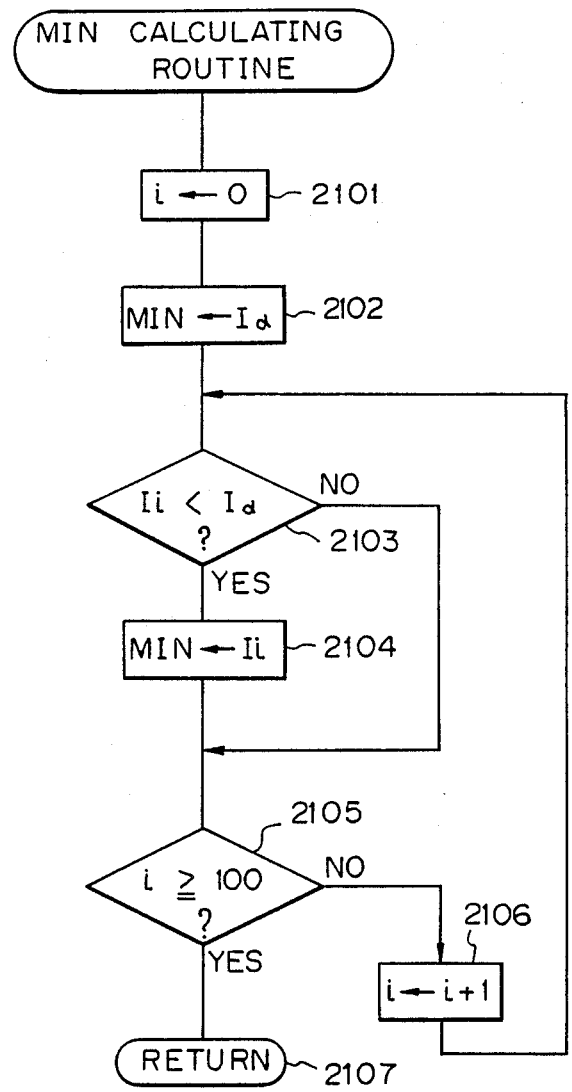

FIG. 21 shows a routine for calculating MIN from the scan data Ii.

At step 2101, the counter i is reset.

The control proceeds to step 2102 which causes MIN to be $I_\alpha$, wherein $I_\alpha$ is a suitable constant.

At step 2103, it is determined whether or not Ii is smaller than MIN. If $Ii < I_\alpha$, the control proceeds to step 2104 which causes MIN to be Ii.

At step 2105, it is determined whether or not Ii is larger than 100. If $i < 100$, the control proceeds to step 2106 in which the counter i is counted up by +1. On the other hand, at step 2103, if Ii≧I$_\alpha$, the control proceeds to step 2105. Thus, steps 2103, 2104, and 2105 are repeated until the counter i is counted up by +100 at step 2106.

At step 2106, when the counter i is counted up by +100, the control proceeds to step 2107 and then returns to step 2004 of FIG. 20. As a result, the minimum scan data is stored in MIN.

Figure 22:
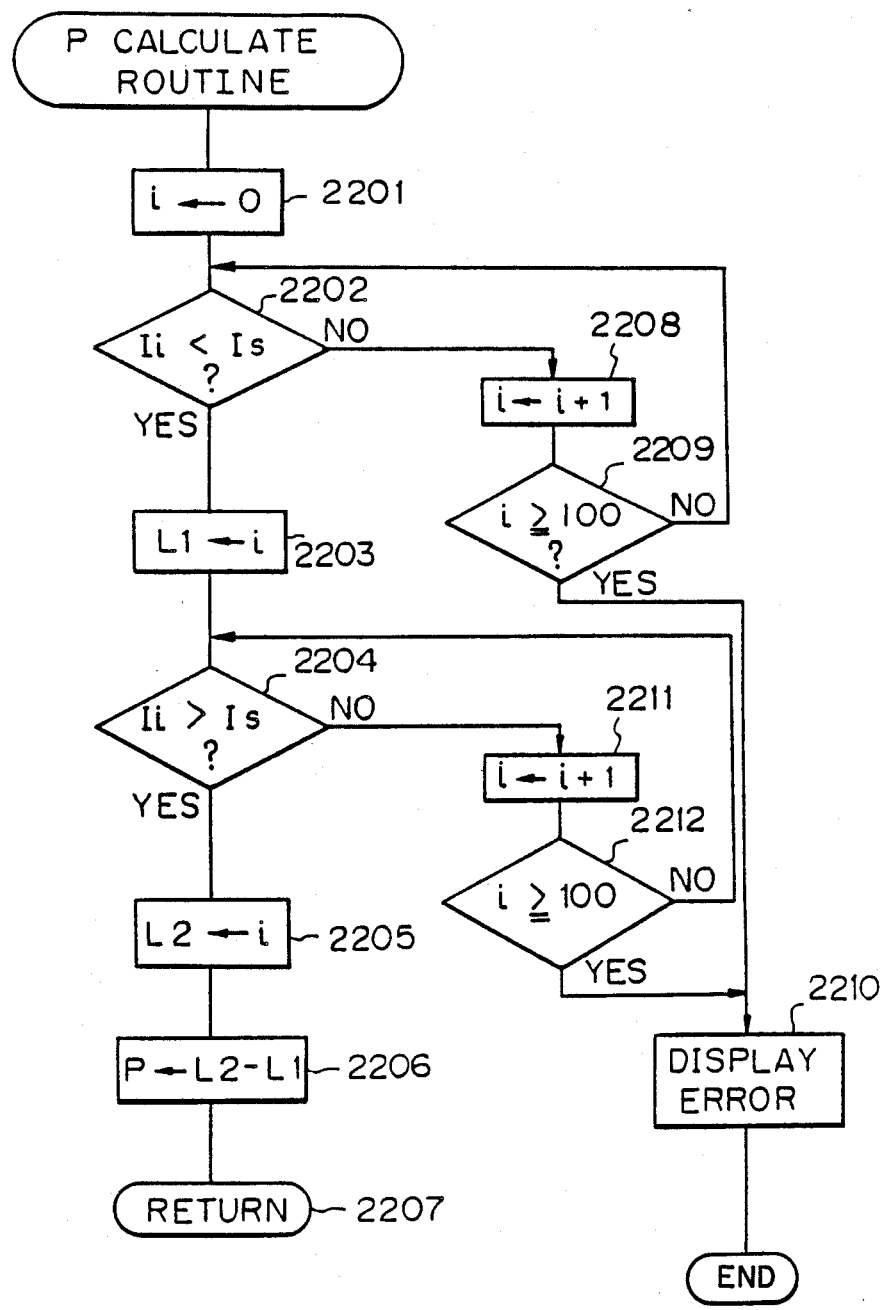

FIG. 22 shows a routine for calculating P from the scan data Ii.

At step 2201, the counter i is reset.

At step 2202, it is determined when Ii becomes a value smaller than Is, wherein Is a predetermined slice level as shown in FIG. 6B. If Ii becomes a value smaller than Is, the control proceeds to step 2203 which causes L 1 to be i.

At step 2204, it is determined when Ii becomes a value larger than Is. If Ii becomes a value larger than Is, the control proceeds to step 2205 which causes L 2 to be i.

At step 2206, P is calculated by

P←L 2−L 1

The control proceeds to step 2207 and then returns to step 2006 of FIG. 20. As a result, the difference Δ=L 2−L 1 is stored in P as the slice pitch value.

There is a case wherein Ii cannot become smaller than Is because the slice level is set too low.

At step 2202, if Ii does not become a value smaller than Is, the control proceeds to step 2208 in which the counter i is counted up by +1. At step 2209, if i <100, the control returns to step 2202. Thus, steps 2202, 2208, and 2209 are repeated until the counter i is counted up by +100.

At step 2209, if i>100, the control proceeds to step 2210 in which an error indicating the impossibility of calculation is displayed on the display unit, and then proceeds to step 2014 of FIG. 20.

Similarly, at step 2204, if Ii does not become a value larger than Is, the control proceeds to step 2211 in which the counter i is counted up by +1. At step 2212, if i<100, the control returns to step 2204. Thus, steps 2204, 2211, and 2212 are repeated until the counter i is counted up by +100.

At step 2212, if i>100, the control proceeds to step 2210 in which an error indicating the impossibility of calculation is displayed on the display unit, and then proceeds to step 2014 of FIG. 20.

When the error is displayed, the measurement may be again carried out by setting a higher slice level.

Figure 23:
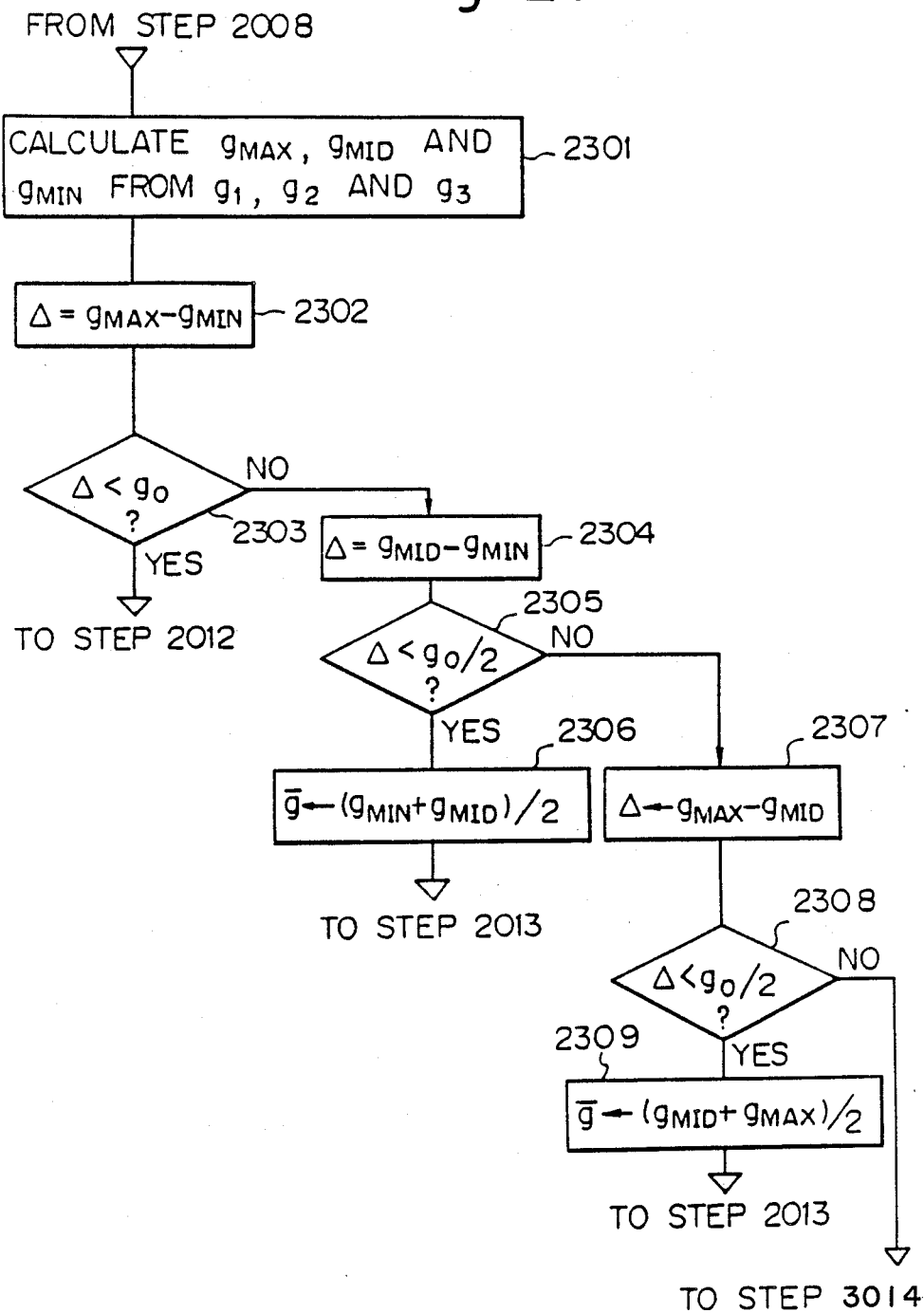

FIG. 23 is a modification of FIG. 20.

At step 2301, calculation is carried out to determine a maximum $g_{MAX}$, a middle $g_{MID}$, and a minimum $g_{MIN}$ among the calculated $g_1$, $g_2$ and $g_3$.

At step 2302, a difference Δ between $g_{MAX}$ and $g_{MIN}$ is calculated by $$\Delta = g_{MAX} - g_{MIN}$$

At step 2303, if Δ<$g_0$, the control proceeds to step 2012 of FIG. 20.

At step 2303, if Δ<$g_0$, the control proceeds to step 2304 which calculates a difference Δ between $g_{MID}$ and $g_{MIN}$ by $$\Delta = g_{MID} - g_{MIN}$$

At step 2305, if Δ<$g_0$/2, the control proceeds to step 2306 which calculates the means value $\bar{g}$ of $g_{MID}$ and $g_{MIN}$ by $$\bar{g} \leftarrow (g_{MIN} + g_{MID})/2$$

Then, the control proceeds to step 2013 of FIG. 20.

At step 2305, if Δ>$g_0$/2, the control proceeds to step 2307 which calculates a difference Δ between $g_{MAX}$ and $g_{MID}$ by $$\Delta = g_{MAX} - g_{MID}$$

At step 2308, if Δ<$g_0$/2, the control proceeds to step 2309 which calculates the mean value $\bar{g}$ of $g_{MAX}$ and $g_{MID}$ by $$\bar{g} \leftarrow (g_{MID} + g_{MAX})/2$$

Then, the control proceeds to step 2013 of FIG. 20.

At step 2308, if Δ>$g_0$/2, the control proceeds to step 2015 of FIG. 20.

When the difference Δ between $g_{MIN}$ and $g_{MAX}$ is larger than the permissible range ($g_0$), one half ($g_0$/2) of the permissible range ($g_0$) is used for both the difference Δ between $g_{MIN}$ and $g_{MID}$ and the difference Δ between $g_{MID}$ and $g_{MAX}$. This is because there may be a case where both the difference Δ between $g_{MIN}$ and $g_{MID}$ and the difference Δ between $g_{MIN}$ and $g_{MAX}$ fall within the permissible range ($g_0$). In order to avoid such a case, one half ($g_0$/2) of the permissible range ($g_0$) is used for both the differences Δ concerned.

Figure 24:
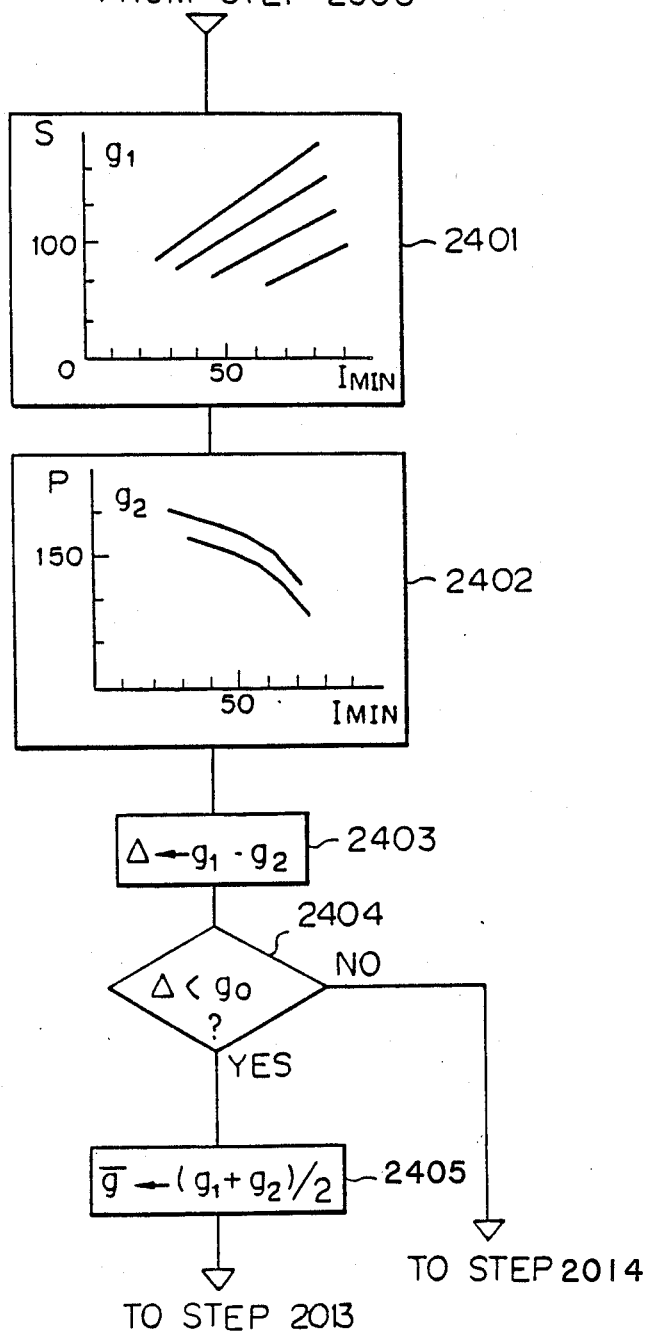

FIG. 24 shows another modification of FIG. 20.

At step 2401, $g_1$ is calculated from a two-dimensional map by using the parameters of MIN and S. The two-dimensional map corresponds to FIG. 10. Accordingly, the calculated $g_1$ may be taken as the gap dimension to be measured.

At step 2402, $g_2$ is calculated from a two-dimensional map by using the parameters of MIN and P. The two-dimensional map corresponds to FIG. 12. Accordingly, the calculated $g_2$ may be taken as the gap dimension to be measured.

The control proceeds to step 2403 which calculates a difference Δ between $g_1$ and $g_2$ by $$\Delta = g_1 - g_2$$

At step 2402, if Δ<$g_0$, the control proceeds to step 2405 which calculates g by $$\bar{g} \leftarrow (g_1 + g_2)/2$$

Then, the control proceeds to step 2013 of FIG. 20.

At step 2404, if Δ>$g_0$, the control proceeds to step 2015 of FIG. 20.

Figure 25:
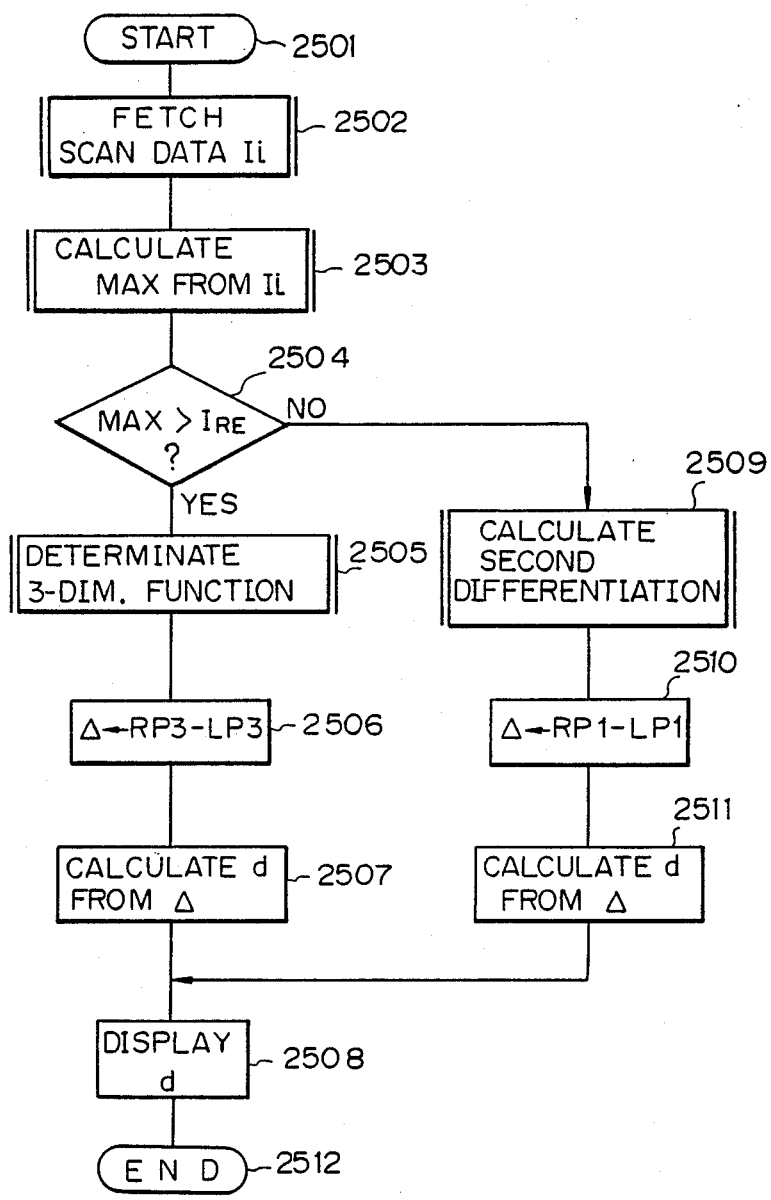

FIG. 25 shows a routine for calculating a dimension d between opposed edges of the element E from a reflected light intensity pattern derived from the element E.

The control is entered into step 2501 by pushing the start button of the switch SW.

The control proceeds to step 2502 in which one hundred scan data $I_0$ to $I_{99}$ are fetched in the same manner as in step 1602 of FIG. 16. The fetched scan data $I_0$ to $I_{99}$ represent the reflected light intensity pattern derived from the element E.

The control then proceeds to step 2503 which calculates a maximum scan data MAX from the scan data $I_0$ to $I_{99}$ in the same manner as in step 1603 of FIG. 16; this maximum scan data corresponding to the maximum peak value of the reflected light intensity pattern.

At step 2504, it is determined whether or not MAX is larger than $I_{RE}$, wherein $I_{RE}$ is predetermined constant value which may be obtained as a peak value of the reflected light intensity reference pattern 28 of FIG. 3.

At step 2504, if MAX>$I_{RE}$, the control proceeds to step 2505 in which a three-dimensional function is determined from each of two portions of the scan data $I_0$ to $I_{99}$ on the basis of the method of least squares, the two portions corresponding to two of the reflected intensity patterns represented thereby, each of which is defined to cover a point of inflection without including a kink point. Step 2505 also includes a differentiation of the three-dimensional function for detecting the two points and the inflection therefrom as two positions RP3 and LP3 corresponding to tee opposed edges of the element E. The three-dimensional function determining step 2505 will be explained hereinafter in detail with reference to FIG. 26.

The control proceeds to step 2506 in which a difference $\Delta$ of RP3 and LP3 is calculated by $$\Delta = RP3 - LP3$$

The control proceeds to step 2507 which calculates a dimension d between the opposed edges from the difference $\Delta$, and the control then proceeds to step 2508 in which the dimension d is displayed in the display unit (not shown).

At step 2504, if MAX<$I_{RE}$, the control proceeds to step 2509 which carries out a second differentiation of the scan data $I_0$ to $I_{99}$ for detecting two kink points from the reflected light intensity pattern represented thereby as two positions RP1 and LP1 corresponding to the opposed edges of the element E. The second differentiation calculating step 2509 will be explained hereinafter in detail with reference to FIG. 27.

The control proceeds to step 2510 in which a difference $\Delta$ of RP1 and LP1 is calculated by $$\Delta = RP1 - LP1$$

The control then proceeds to step 2511 which calculates a dimension d between the opposed edges from the difference $\Delta$, and then the control proceeds to step 2508 in which the dimension d is displayed in the display unit. This routine of FIG. 25 is completed by step 2512.

Figure 26A:
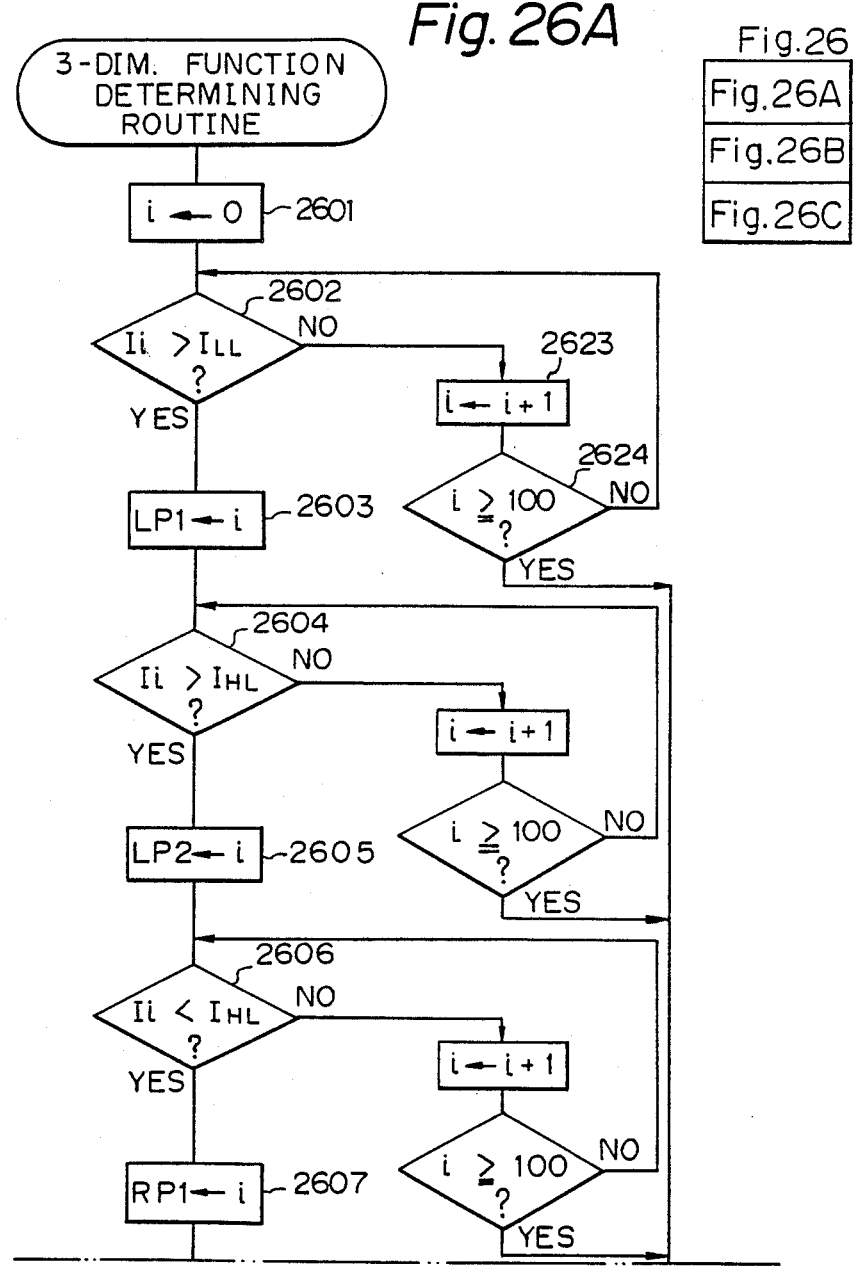
Figure 26B:
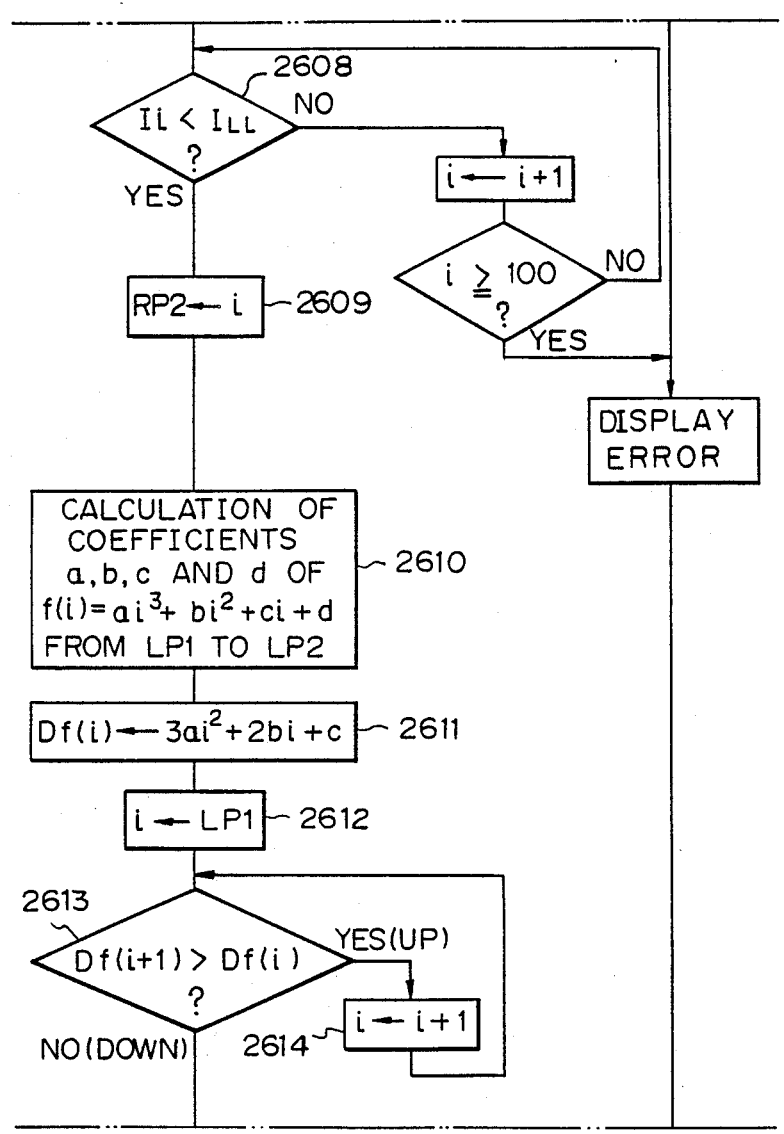
Figure 26C:
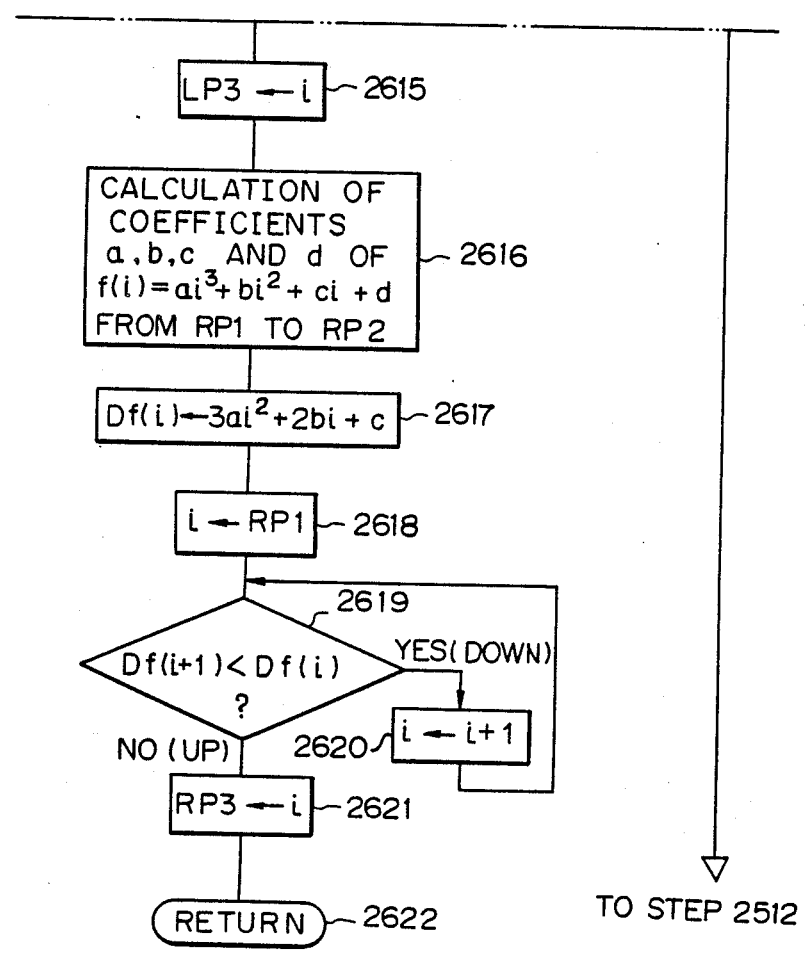

FIG. 26 is a routine for determining the three-dimensional function and for differentiating that function to detect RP3 and LP3.

At step 2601, the counter i is reset.

At step 2602, it is determined when Ii becomes a value larger than $I_{LL}$, wherein $I_{LL}$ is a predetermined constant. In particular, $I_{LL}$ corresponds to the lowest level of the portions of the pattern 25 which are defined by the LR and RR ranges a shown in FIG. 13A. If Ii reaches a larger value than $I_{LL}$, the control proceeds to step 2603 which causes LP1 to be i.

At step 2604, it is determined when Ii becomes a value larger than $I_{HL}$, wherein $I_{HL}$ is a predetermined constant. In particular, $I_{HL}$ corresponds to the highest level of the portion of the pattern 25 which are defined by the LR ad RR ranges as shown in FIG. 13A. If Ii becomes a value larger than $I_{HL}$, the control proceeds to step 2605 which causes LP2 to be i.

At step 2606, it is determined when Ii becomes a value smaller than $I_{HL}$. If Ii becomes a value smaller than $I_{HL}$, the control proceeds to step 2607 which causes RP1 to be i.

At step 2608, it is determined when Ii becomes a value smaller than $I_{LL}$. If Ii becomes a value smaller than $I_{LL}$, the control proceeds to step 2609 which causes RP2 to be i.

At step 2610, coefficients a, b, c, and d of the three-dimensional function $[f(i) = ai^3 + bi^2 + ci + d]$ are calculated from the scan data Ii within the range of from LP1 to LP2 on the basis of the method of least squares.

At step 2611, f(i) is differentiated by $$Df(i) \leftarrow 3ai^2 + 2bi + c$$

The control proceeds to step 2612 which causes i to be LP1.

At step 2613, it is determined whether or not the following condition is satisfied:

$$Df(i+1) > Df(i)$$

If this condition is satisfied, the control proceeds to step 2614 which counts up by +1, and then returns to step 2613. If the condition is not satisfied, the control proceeds to step 2615 which causes i to be LP3.

At step 2616, coefficients a, b, c, and d of the three-dimensional function $[f(i) = ai^3 + bi^2 + ci + d]$ are calculated from the scan data Ii within the range of from RP1 to RP2 on the basis of the method of least squares.

At step 2617, f(i) is differentiated by $$Df(i) \leftarrow 3ai^2 + 2bi + c$$

The control ten proceeds to step 2618 which causes i to be RP1.

At step 2619, it is determined whether or not the following condition is satisfied:

$$Df(i+1) < Df(i)$$

If this condition is satisfied, the control proceeds to step 2620 which counts up by +1, and then returns to step 2619. If the condition is not satisfied, the control proceeds to step 2621 which causes i to be RP3.

The control then proceeds to step 2622 and then returns to step 2506.

As apparent from FIGS. 2A and 2B, each of the inflection positions LP3 and RP3 can be represented by the corresponding deflection voltage. In other words, the difference $\Delta$ calculated in step 2506 corresponds to that between the deflection voltages at the inflection positions LP3 and RP3. Accordingly, in step 2507, the dimension d is obtained by multiplying the difference $\Delta$ by a coefficient as shown by k (the unit of scanning distance) in FIG. 2A.

At step 2602, if Ii does not become a value larger than $I_{LL}$, the control proceeds to step 2623 in which the counter i is counted up by +1. At step 2623, if i <100, the control returns to step 2602. Thus, steps 2602, 2623, and 2624 are repeated until the counter i is counted up by +100.

At step 2624, if i>100, the control proceeds to step 2625 in which an error indicating the impossibility of calculation is displayed on the display unit, and then proceeds to step 2512 of FIG. 25. The same is true for steps 2604, 2606, and 2608.

FIG. 2 is a routine for carrying out a second differentiation of the scan data $I_0$ to $I_{99}$ to detect the positions RP1 and LP1.

At step 2701, the counter i is reset.

At step 2702, $\Delta^2$ is calculated by $$\Delta^2 \leftarrow I_{i+1} - 2I_i + I_{i-1}$$

At step 2703, if $\Delta^2 < 0$, the control proceeds to step 2704 which causes LP1 to be i. LP1 corresponds to the kink point 30.

At step 2705, if $\Delta^2 < 0$, the control proceeds to step 2706 which causes RP1 to be i. RP1 corresponds to the kink point 30'.

The control proceeds to step 2706 and then returns to 2510 of FIG. 25.

The difference $\Delta$ calculated in step 2510 also corresponds to that between the deflection voltages at the kink positions LP1 and RP1. However, in order to calculate the dimension d from the difference $\Delta$ (RP1-LP1) in step 2511, it is impossible to use the same coefficient as in inflection points LP3 and RP3. This is because the kink positions LP1 and RP1 depend upon the diameter D of the laser beam. In this case, the coefficient k' concerned can be obtained from the following relationship:

$$\Delta \cdot k = k' (D - d)$$

In particular, k' can be obtained by actually carrying out the measurement on a known sample distance.

Figure 27:
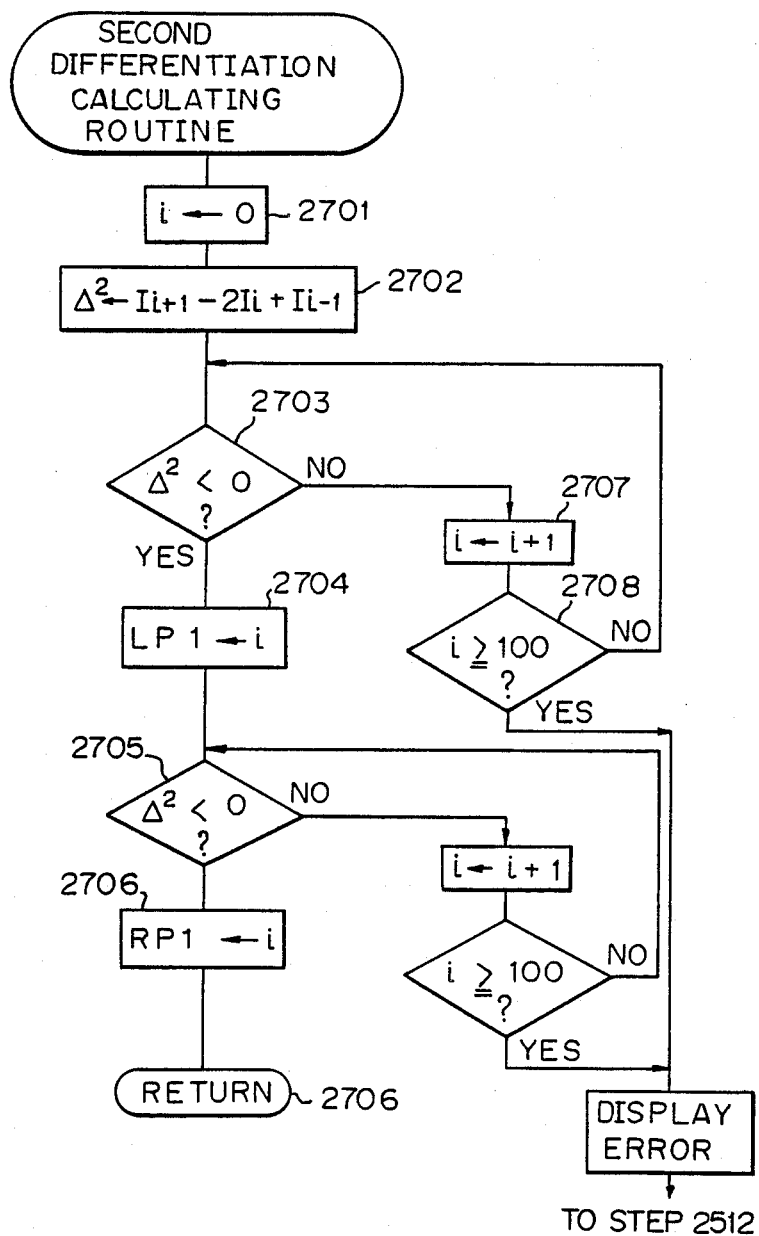

In the routine of FIG. 27, when the LP1 and RP1 are found, it is also possible to process the two portions of the pattern representing the scan data $I_0$ to $I_{99}$, which include the kink points 30 and 30' as illustrated in FIG. 14A.

At step 2703, if $\Delta^2 > 0$, the control proceeds to step 2707 in which the counter i is counted up by +1. At step 2708, if i<100, the control returns to step 2708. Thus, steps 2703, 2707, and 2708 are repeated until the counter i is counted up by +100.

At step 2708, if i<100, the control proceeds to step 2709 in which an error indicating the impossibility of calculation s displayed on the display unit, and then proceeds to step 2512 of FIG. 25. The same is true for step 2705.

It will be further understood by those skilled in the art that the foregoing description is a preferred embodiment of the disclosed apparatus and that various changes and modifications may be made in the present invention without departing from the spirit and scope thereof.

I claim:

1. A micro-dimensional measurement apparatus for optically measuring a distance between opposed edges formed on a surface of a substrate, which comprises:
   a light source for generating a light beam having a predetermined light intensity distribution;
   an optical scanning system for scanning the substrate with the light beam so that the light beam crosses over said distance between said opposed edges formed thereon;
   means for detecting intensity information of the light reflected from the substrate;
   means for providing a reflected light intensity data pattern for a scanning distance of said light beam in accordance with the detected light intensity information;
   means for calculating reflection data corresponding to both data of a first kind and data of a second kind different from the first kind from said reflected light intensity data pattern;
   means for storing reference data corresponding to said calculated reflection data, of said first and second kind for a series of reflected light intensity sample data patterns of predetermined sample distances; said first and second different kinds corresponding to a combination of either a peak value and an integrated value, or a combination of a peak value and a slice pitch value at a predetermined level, or a combination of an integrated value and a slice pitch value at a predetermined level;
   means utilizing said stored reference data of both the first and second kind for calculating two corresponding values relating to the distance to be measured between said opposed edges in accordance with calculated reflection data values of the first and second kind respectively;
   means for calculating the difference between said two calculated distance values;
   means for determining whether or not said difference falls within a permissible range; and
   means for calculating a mean value from said two calculated distance values for determining the distance between said opposed edges at times when said calculated difference falls within said permissible range.

2. A micro-dimensional measurement apparatus as set forth in claim 1, wherein said optical scanning system includes an acoustic optical element, and an acoustic optical element driver for generating ultrasonic acoustic travelling waves, for deflecting said light beam from the acoustic optical element to scan the substrate.

3. A micro-dimensional measurement apparatus as set forth in claim 1, wherein said means for calculating the two distance values from said two kinds of reference data in accordance with said two kinds of reflection data includes means for interpolating the reference data and reflection data.

4. A micro-dimensional measurement apparatus as set forth in claim 1, wherein the light intensity distribution of said light beam is a Gaussian distribution.

5. A micro-dimensional measurement apparatus as set forth in claim 1, wherein a reflectivity of a measuring zone to be scanned between said opposed edges is variable and said series of reflected light intensity sample data patterns is provided for predetermined sample distances of each of predetermined variable sample reflectivities for the measuring zone to be scanned between said opposed edges.

6. A micro-dimensional measurement apparatus as set forth in claim 5, wherein said optical scanning system includes an acoustic optical element, and an acoustic optical element driver for generating ultrasonic acoustic travelling waves, for deflecting said light beam from the acoustic optic element to scan the substrate.

7. A micro-dimensional measurement apparatus as set forth in claim 5, wherein said means for calculating the two distance values from said two kinds of reference data in accordance with said two kinds of reflection data includes means for interpolating the reference data and reflection data.

8. A micro-dimensional measurement apparatus as set forth in claim 5, wherein the light intensity distribution of said light beam is a Gaussian distribution.

9. A micro-dimensional measurement apparatus for optically measuring a distance between opposed edges formed on a surface of a substrate, which comprises:
- a light source for generating a light beam having a predetermined light intensity distribution;
- an optical scanning system for scanning the substrate with the light beam so that the light beam crosses over said distance between said opposed edges formed thereon;
- means for detecting intensity information of the light reflected from the substrate;
- means for providing a reflected light intensity data pattern for a scanning distance of said light beam in accordance with the detected light intensity information;
- means for calculating three different kinds of reflection data from said reflected light intensity data pattern, one of said three different kinds of reflection data consisting of a peak value of said reflected light intensity data pattern, another of said three different kinds of reflection data consisting of an integrated value of said reflected light intensity data pattern, and the other of said three different kinds of reflection data consisting of a slice pitch value obtained by slicing said reflected light intensity data pattern at a predetermined level;
- means for storing three different kind of reference data corresponding to said three different kinds of reflection data, respectively, one of said three different kinds of reference data consisting of peak values of a series of reflected light intensity sample patterns corresponding to said reflected light intensity data pattern, another of said three different kinds of reference data consisting of integrated values of said series of reflected light intensity sample patterns, and the other of said three different kinds of reference data consisting of slice pitch values obtained by slicing said series of reflected light intensity sample patterns at said predetermined level, said series of reflected light intensity sample patterns being provided for predetermined sample distances;
- means for calculating three distance values for the distance to be measured between said opposed edges from said three kinds of reference data in accordance with said three kinds of reflection data, respectively;
- means for determining whether or not said three distance values fall within a permissible range; and
- means for calculating a mean value from said three distance values as a distance dimension between said opposed edges at times when said three distance values fall within said permissible range.

10. A micro-dimensional measurement apparatus for optically measuring a distance between opposed edges formed on a surface of a substrate, comprising:
- a light source for generating a light beam having a predetermined light intensity distribution;
- an optical scanning system for scanning the substrate with the light beam so that the light beam crosses over said distance between said opposed edges formed thereon;
- means for detecting intensity information of the light reflected from the substrate;
- means for providing a reflected light intensity data pattern for a scanning distance of said light beam in accordance with the detected light intensity information;
- means for calculating three different kinds of reflection data from said reflected light intensity data pattern, one of said three different kinds of reflection data consisting of a peak value of said reflected light intensity data pattern, another of said three different kinds of reflection data consisting of an integrated value of said reflected light intensity data pattern, and the other of said three different kind of reflection data consisting of a slice pitch value obtained by slicing said reflected light intensity data pattern at a predetermined level;
- means for storing three different kinds of reference data which correspond to said three different kinds of reflection data, respectively, one of said three different kinds of reference data consisting of peak values of a series of reflected light intensity sample patterns corresponding to said reflected light intensity data pattern, another of said three different kinds of reference data consisting of integrated values of said series of reflected light intensity sample patterns, and the other of said three different kind of reference data consisting of slice pitch values obtained by slicing said series of reflected light intensity sample patterns at said predetermined level, said series of reflected light intensity sample patterns being provided for predetermined sample distances;
- means for calculating three distance values for the distance to be measured between said opposed edges from said three different kinds of reference data in accordance with said three kinds of reflection data, respectively;
- means for calculating the maximum, intermediate and minimum values from said three distance values;
- means for calculating the difference between the maximum and minimum values;
- means for determining whether or not the calculated difference between the maximum and minimum values falls within a permissible range;
- means for calculating a mean value from said three calculated distance values as a dimension to be measured between said opposed edges at times when the distance value between the maximum and minimum values falls within said permissible range;
- means for calculating the difference between the intermediate value and one of either the minimum or maximum value at times when the calculated difference is outside said permissible range;
- means for determining whether or not said calculated two difference falls within a permissible range narrower than one half of said permissible range; and
- means for calculating, at times when said calculated difference falls within the narrower permissible range, a mean value from the intermediate value and the corresponding one of either the minimum and maximum values used in obtaining the calculated difference as a measured dimension between said opposed edges.

11. A micro-dimensional measurement apparatus as set forth in claim 10, wherein said optical scanning system includes an acoustic-optical element, and an acoustic-optical element driver for generating ultrasonic acoustic travelling waves, for deflecting said light beam from the acoustic optical element to scan the substrate.

12. A micro-dimensional measurement apparatus as set forth in claim 10, wherein said means for calculating the three distance values from said three kinds of reference data in accordance with said three kinds of reflection data includes means for interpolating the reference data and reflection data.

13. A micro-dimensional measurement apparatus as set forth in claim 10, wherein the light intensity distribution of said light beam is a Gaussian distribution.

14. A micro-dimensional measurement apparatus as set forth in claim 10, wherein reflectivity of a measuring zone to be scanned between said opposed edges is variable; and said series of reflected light intensity sample patterns is provided for predetermined sample distances of each of predetermined variable sample reflectivities for the measuring one to be scanned between said opposed edges.

15. A micro-dimensional measurement apparatus as set forth in claim 14, wherein said optical scanning system includes an acoustic-optical element, and an acoustic-optical element driver for generating ultrasonic acoustic travelling waves, for deflecting said light beam from the acoustic optical element to scan the substrate.

16. A micro-dimensional measurement apparatus as set forth in claim 14, wherein said means for calculating the three distance values from said three kinds of reference data in accordance with said three kinds of reflection data includes means for interpolating the reference data and reflection data.

17. A micro-dimensional measurement apparatus as set forth in claim 14, wherein the light intensity distribution of said light beam is a Gaussian distribution.

18. A micro-dimensional measurement apparatus as set forth in claim 9, wherein said optical scanning system includes an acoustic-optical element, and an acoustic-optical element driver for generating ultrasonic acoustic travelling waves, for deflecting said light beam from the acoustic optical element to scan the substrate.

19. A micro-dimensional measurement apparatus as set forth in claim 9, wherein said means for calculating the three distance values from said three kinds of reference data in accordance with said three kinds of reflection data includes means for interpolating the reference data and reflection data.

20. A micro-dimensional measurement apparatus as set forth in claim 9, wherein the light intensity distribution of said light beam is a Gaussian distribution.

21. A micro-dimensional measurement apparatus as set forth in claim 9, wherein reflectivity of a measuring zone to be scanned between said opposed edges is variable; and said series of reflected light intensity sample patterns is provided for predetermined sample distances of each of predetermined variable sample reflectivities for the measuring zone to be scanned between said opposed edges.

22. A micro-dimensional measurement apparatus as set forth in claim 21, wherein said optical scanning system includes an acoustic-optical element, and an acoustic-optical element driver for generating ultrasonic acoustic travelling waves, for deflecting said light beam from the acoustic optical element to scan the substrate.

23. A micro-dimensional measurement apparatus as set forth in claim 21, wherein said means for calculating the three distance values from said three kinds of reference data in accordance with said three kinds of reflection data includes means for interpolating the reference data and reflection data.

24. A micro-dimensional measurement apparatus as set forth in claim 21, wherein the light intensity distribution of said light beam is a Gaussian distribution.

25. A micro-dimensional measurement apparatus for optically measuring a distance between opposed edges formed on a surface of a substrate, reflectivity of a measuring zone between said opposed edges being variable, which comprises:

a light source for generating a light beam having a predetermined light intensity distribution;

an optical scanning system for scanning the substrate with the light beam so that the light beam crosses over said distance between said opposed edges formed thereon;

means for detecting intensity information of the light reflected from the substrate;

means for providing a reflected light intensity data pattern for a scanning distance of said light beam in accordance with the detected light intensity information;

means for calculating three different kinds of reflection data from said reflected light intensity data pattern, one of said three different kinds of reflection data consisting of a peak value of said reflected light intensity data pattern, another of said three different kinds of reflection data consisting of an integrated value of said reflected light intensity data pattern, and the other of said three kinds of reflection data consisting of a slice pitch value obtained by slicing said reflected light intensity data pattern at a predetermined level;

means for storing three different kinds of reference data which correspond to said three kinds of reflection data, respectively, one of said three different kinds of reference data consisting of peak values of a series of reflected light intensity sample patterns corresponding to said reflected light intensity data pattern, another of said three different kinds of reference data consisting of integrated values of said series of reflected light intensity sample patterns, and the other of said three different kinds of reference data consisting of slice pitch values obtained by slicing said series of reflected light intensity sample patterns at said predetermined level, said series of reflected light intensity sample patterns being prepared with respect to predetermined sample distances of each of predetermined sample reflectivities for the measuring zone to be scanned between said opposed edges;

means for calculating a distance value for the distance to be measured between said opposed edges from the peak and integrated values of said three different kinds of reference data in accordance with the peak and integrated values of said three different kinds of reflection data;

means for calculating another distance value for the distance to be measured between said opposed edges from the peak and slice pitch values of said three different kinds of reference data in accordance with the peak and slice pitch values of said three different kinds of reflection data;

means for calculating the difference between said one and another calculated distance values;

means for determining whether or not said difference falls within a permissible range; and means for calculating a mean value from said two distance values as a measured dimension between said opposed edges at times when said difference falls within said permissible range.

26. A micro-dimensional measurement apparatus as set forth in claim 25, wherein said optical scanning system includes an acoustic-optical element, and an acoustic-optical element driver for generating ultrasonic acoustic travelling waves, for deflecting said light beam from the acoustic optical element to scan the substrate.

27. A micro-dimensional measurement apparatus as set forth in claim 25, wherein each of said means for calculating the two distance values includes means for interpolating the corresponding reference data and reflection data.

28. A micro-dimensional measurement apparatus as set forth in claim 25, wherein the light intensity distribution of said light beam is a Gaussian distribution.

29. A micro-dimensional measurement apparatus for optically measuring a distance between opposed edges formed on a surface of a substrate by use of a laser beam having a Gaussian intensity distribution, said opposed edges being equal to or smaller than a diameter of the laser beam, which comprises:
  an optical scanning system for scanning the substrate with the laser beam so that said light beam crosses over said opposed edges formed thereon;
  means for detecting intensity information of the light reflected from the substrate;
  means for providing a reflected light intensity data pattern for a scanning distance of said light beam in accordance with the detected light intensity information;
  means for calculating at least one value corresponding to either a peak value, an integrated value, and a slice pitch value obtained from said reflected light intensity data pattern;
  means for storing at least one predetermined reference value corresponding to said at least one calculated value, said at least one reference value being obtained from a reflected light intensity sample pattern provided for a sample distance equal to 65% of a diameter of said laser beam;
  means for comparing said at least one calculated value with said reference value;
  means for calculating a three-dimensional function which approximately represents a part of said reflected light intensity data pattern at each side of the peak value thereof at times when said at least one calculated value is larger than said at least one reference value, said part corresponding to an intensity range which is predetermined on the basis of said reflected light intensity sample pattern;
  means for differentiating said three-dimensional function to determine a point of inflection within said intensity range at each side of the peak of said reflected light intensity data pattern;
  means for calculating a scanning distance between the two determined points of inflection;
  means for calculating a distance value between said opposed edges in accordance with said scanning distance between the determined points of inflection;
  means for twice differentiating said reflected light intensity data pattern to determine two kink points thereof at the sides of the peak thereof, respectively, at times when said at least one calculated value is smaller than said reference value;
  means for calculating a scanning distance between the two determined kink points; and
  means for calculating a distance value between said opposed edges in accordance with said scanning distance between said two kink points.

30. A micro-dimensional measurement apparatus as set forth in claim 29, wherein said reflected light intensity sample pattern is provided for a sample distance equal to a diameter of said laser beam, said intensity range being from 25 to 75% of the peak intensity of said reflected light intensity sample pattern.

* * * * *